US012745714B2

(12) United States Patent
Soles et al.

(10) Patent No.: US 12,745,714 B2
(45) Date of Patent: Sep. 29, 2026

(54) FILL UNDER GRAIN COVER

(71) Applicant: Soles Enterprises, Inc, Brandon, SD (US)

(72) Inventors: Ben Soles, Brandon, SD (US); Ralph Soles, III, Brandon, SD (US)

(73) Assignee: Soles Enterprises, Inc., Brandon, SD (US)

( * ) Notice: Subject to any disclaimer, the term of this patent is extended or adjusted under 35 U.S.C. 154(b) by 208 days.

(21) Appl. No.: 18/600,363

(22) Filed: Mar. 8, 2024

(65) Prior Publication Data

US 2024/0206401 A1 Jun. 27, 2024

Related U.S. Application Data

(63) Continuation-in-part of application No. 17/888,374, filed on Aug. 15, 2022, now Pat. No. 12,035,660, which is a continuation of application No. 17/117,428, filed on Dec. 10, 2020, now Pat. No. 11,412,664.

(51) Int. Cl.

| | |
|---|---|
| ***A01F 25/13*** | (2006.01) |
| ***B65G 3/04*** | (2006.01) |
| ***B65G 65/28*** | (2006.01) |
| ***E04H 7/22*** | (2006.01) |

(52) U.S. Cl.

CPC ................ *A01F 25/13* (2013.01); *B65G 3/04* (2013.01); *B65G 65/28* (2013.01); *E04H 7/22* (2013.01)

(58) Field of Classification Search

CPC ........... B65G 3/02; B65G 65/28; A01F 25/13; E04H 7/22; E04H 2007/225; E04H 15/54; E04H 15/26

See application file for complete search history.

(56) References Cited

U.S. PATENT DOCUMENTS

| | | | | |
|---|---|---|---|---|
| 2,804,897 A * | 9/1957 | Wunderwald | B65D 88/16 | 383/102 |
| 3,727,656 A * | 4/1973 | Luders | B65D 88/16 | 52/63 |
| 4,454,807 A * | 6/1984 | Wolstenholme | B65G 3/02 | 414/919 |

(Continued)

FOREIGN PATENT DOCUMENTS

CN 207033041 U 2/2018

*Primary Examiner* — Andrew J Triggs

(74) *Attorney, Agent, or Firm* — Goodhue, Coleman & Owens, P.C.

(57) ABSTRACT

A fill under tarp for grain and center tower skirt are disclosed. A tarp body has a plurality of tarp sections and a tarp section seam disposed between each adjoining tarp section. A yoke has a center, an inner terminal edge defining a yoke opening and an outer terminal edge. The yoke is disposed generally in the center of the tarp body and configured for strengthening the tarp body. A center tower skirt has a plurality of skirt sections with opposing section edges disposed between opposing upper and lower terminal edges. The lower terminal edges define a center tower skirt opening coincident with the yoke opening configured to receive grain for storing underneath the fill under tarp. At least one of the section edges of each center tower skirt section includes a flared and/or flap portions to prevent grain leakage.

10 Claims, 21 Drawing Sheets

(56) References Cited

U.S. PATENT DOCUMENTS

| | | | | | |
|---|---|---|---|---|---|
| 4,493,248 | A * | 1/1985 | Wolstenholme | B65G 3/02 | |
| | | | | 366/101 | |
| RE32,536 | E * | 11/1987 | Wolstenholme | B65G 3/02 | |
| | | | | 414/919 | |
| 5,263,896 | A * | 11/1993 | Carroll | B65G 3/02 | |
| | | | | 454/181 | |
| 9,347,239 | B2 * | 5/2016 | Gaudet, Jr. | B65C 3/02 | |
| 10,378,235 | B1 | 8/2019 | Volin | | |
| 11,412,664 | B2 * | 8/2022 | Soles | B65G 65/28 | |
| 12,035,660 | B2 * | 7/2024 | Soles | A01F 25/13 | |
| 2016/0010354 | A1 * | 1/2016 | Gaudet, III | B32B 5/024 | |
| | | | | 428/221 | |
| 2020/0063429 | A1 | 2/2020 | Carter | | |
| 2022/0183233 | A1 * | 6/2022 | Soles | B65G 69/181 | |
| 2022/0386536 | A1 * | 12/2022 | Soles | B65G 3/02 | |
| 2024/0206401 | A1 * | 6/2024 | Soles | A01F 25/13 | |
| 2025/0280766 | A1 * | 9/2025 | Soles | A01F 25/13 | |

* cited by examiner

FILL UNDER GRAIN COVER

CROSS-REFERENCE TO RELATED APPLICATIONS

This application is a continuation-in-part and claims priority to U.S. patent application Ser. No. 17/888,374 filed on Aug. 15, 2022 which is a continuation of U.S. patent application Ser. No. 17/117,428 filed on Dec. 10, 2020 now U.S. Pat. No. 11,412,664, which are incorporated by reference in their entirety.

FIELD OF THE DISCLOSURE

The present disclosure relates to a cover for temporarily storing agricultural grains. More particularly, but not exclusively, the present disclosure relates to a fill under cover, such as a tarp, for covering agricultural grains.

BACKGROUND

Coverings, such as fill under tarps, are used to cover grain (e.g., corn, soybean, milo, and wheat) that is temporarily stored at a grain storage site or other suitable locations. In the case of a fill under tarp, the tarp is typically installed at the grain storage site before being filled with grain. The fill under tarp forms a generally conically shaped pile of covered grain when filled. Fill under tarps typically have seams joining several sections of material and transitional seams joining materials can be different by type, thickness, and quality. Collectively these materials form an assembled fill under covering. If the fill under tarp fails, it often occurs at one or more of the seams, and more often one or more of the transition seams. This is especially true for the transition seam between the yoke and tarp body. It is also the case that the assembled sections of a fill under tarp do not best approximate the conically shaped pile of covered grain thereby resulting in wasted material and uneven stress distributions at seams, transitions, and connections to the tower. Further challenges exist with the differing shapes of the tower skirt and yoke, complications in the transition between the tower skirt and yoke, and accommodations in the tower skirt connections to prevent complications during assembly and use. Therefore, what is needed is a fill under grain covering that addresses these and other deficiencies.

SUMMARY

Therefore, it is a primary object, feature, or advantage of the present disclosure to improve over the state of the art.

It is a further object, feature, or advantage of the present disclosure to provide a grain cover that is configured to address and remedy failures in existing grain covers.

It is another further object, feature, or advantage of the present disclosure to provide a tower skirt that is configured to address and remedy failures and difficulties in the assembly and use of existing tower skirts.

It is a still further object, feature, or advantage of the present disclosure to provide a fill under tarp that is configured to address and remedy failures in existing fill under tarps.

Another object, feature, or advantage is to provide a fill under tarp that includes a yoke configuration addressing and remedying failures in existing yoke configurations.

Yet another object, feature, or advantage is to provide a fill under tarp that includes a transitional seam between the yoke and tarp body that addresses and remedies failures in existing transitional seams.

Still another object, feature, or advantage is to provide a fill under tarp that includes a yoke and tarp body configured to approximate the conically shaped pile of covered grain to address and remedy, for example, wasted material and uneven stress distributions at seams, transitions, and connections to the tower.

According to at least one aspect, a fill under tarp for grain and grain storage system is disclosed. The fill under tarp can be configured to include a tarp body having a plurality of tarp sections where each tarp section has an inner edge extending to a terminal outer edge defining an outer perimeter of the tarp body. A tarp section seam is disposed between each adjoining tarp section whereby the seam extends between the inner and terminal outer edge of the tarp body. A yoke having a center and opposing inner and outer terminal edges is disposed generally in the center of the tarp body and configured for strengthening the tarp body. A corner of the outer terminal edge of the yoke is disposed coincident with the tarp section seam. A transition seam is disposed between the outer terminal edge of the yoke and inner edge of the tarp body. An opening in the yoke has an outer circumference coincident with the inner edge of the yoke so that the opening is configured to receive grain for storing underneath the fill under tarp.

According to at least one other aspect, a fill under tarp for grain is disclosed. The fill under tarp includes a tarp body having a plurality of tarp sections, where each tarp section has an inner edge extending to a terminal outer edge defining a circular outer perimeter of the tarp body. A tarp section seam is disposed between each adjoining tarp section. The tarp section seam extends between the inner and terminal outer edge of the tarp body. A yoke has a center, an inner circular-shaped edge, an outer square-shaped edge having four vertices, and diagonals between the four vertices. The yoke is disposed generally in the center of the tarp body and configured for strengthening the tarp body. A corner at each of the vertices of the outer square-shaped edge of the yoke is disposed coincident with the tarp section seam. A transition seam is disposed between the outer square-shaped edge of the yoke and inner edge of the tarp body. An opening in the yoke has an outer circumference coincident with the inner edge of the yoke. The opening is configured to receive grain for storing underneath the fill under tarp.

According to another aspect, a grain storage system is disclosed. The grain storage system includes, for example, a grain storage location having a barrier wall forming a bunker. A tower structure is operably configured with a conveyor for transporting grain to store within the bunker. A fill under tarp is supported by the tower structure atop the bunker. The fill under tarp includes, for example, a tarp body having a plurality of tarp sections where each tarp section has an inner edge extending to a terminal outer edge defining an outer perimeter of the tarp body. The terminal outer edge is battened to the barrier wall. A tarp section seam is disposed between each adjoining tarp section. The tarp section seam extends between the inner and terminal outer edge of the tarp body. A yoke has a center and opposing inner and outer terminal edges, and the yoke is disposed generally in the center of the tarp body and configured for strengthening the tarp body. A corner of the outer terminal edge of the yoke is disposed coincident with the tarp section seam. A transition seam is disposed between the outer terminal edge of the yoke and inner edge of the tarp body. An opening in the yoke has an outer circumference coincident with the inner edge of the yoke. The opening is configured to receive grain from the conveyor for storing in the bunker underneath the fill under tarp.

According to one other exemplary aspect, a fill under tarp for grain is disclosed. The fill under tarp includes a tarp body having a plurality of tarp sections. Each tarp section has an inner edge extending to a terminal outer edge defining an outer perimeter of the tarp body. A tarp section seam is disposed between each adjoining tarp section. The tarp section seam extends between the inner and terminal outer edge of the tarp body. A yoke has a center, an inner terminal edge defining a yoke opening and an outer terminal edge. The yoke is disposed generally in the center of the tarp body and configured for strengthening the tarp body. A center tower skirt has a plurality of skirt sections. Each skirt section has opposing section edges disposed between opposing upper and lower terminal edges. The lower terminal edges of the center tower skirt define a center tower skirt opening coincident with the yoke opening configured to receive grain for storing underneath the fill under tarp. At least one of the section edges of each center tower skirt section includes a flared portion with converging, outwardly extending flared edges. A transition seam is disposed between the outer terminal edge of the yoke and inner edge of the tarp body.

According to another exemplary aspect, a fill under tarp for grain is disclosed. The fill under tarp includes a tarp body having a plurality of tarp sections. Each tarp section has an inner edge extending to a terminal outer edge defining a circular outer perimeter of the tarp body. A tarp section seam is disposed between each adjoining tarp section. The tarp section seam extends between the inner and terminal outer edge of the tarp body. A yoke has a center opening and outer edge joined to adjoining tarp sections. A transition seam is disposed between the outer edge of the yoke and inner edge of the tarp body. An opening in the yoke has an outer circumference coincident with the inner edge of the yoke. A center tower skirt has a plurality of skirt sections. Each skirt section has opposing section edges disposed between opposing upper and lower terminal edges. The lower terminal edges of the center tower skirt define a center tower skirt opening coincident with the yoke opening configured to receive grain for storing underneath the fill under tarp. A center tower skirt gap bridging insert has a lower edge spaced between opposing, upwardly extending converging edges. The converging edges of the center tower skirt bridging insert are joined to a portion of sections edges of adjoining skirt sections.

According to at least one other exemplary aspect, a center tower skirt of a fill under grain tarp is disclosed. The center tower skirt of a fill under tarp includes a plurality of skirt sections. Each skirt section has opposing section edges disposed between opposing upper and lower terminal edges. The lower terminal edges of the center tower skirt define a center tower skirt opening configured for aligning with a yoke opening configured to receive grain for storing underneath the fill under tarp. At least one of the section edges proximate the lower terminal edge of each center tower skirt section includes a flap with converging, outwardly extending flap edges.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein, and where.

DETAILED DESCRIPTION

Figure 1:
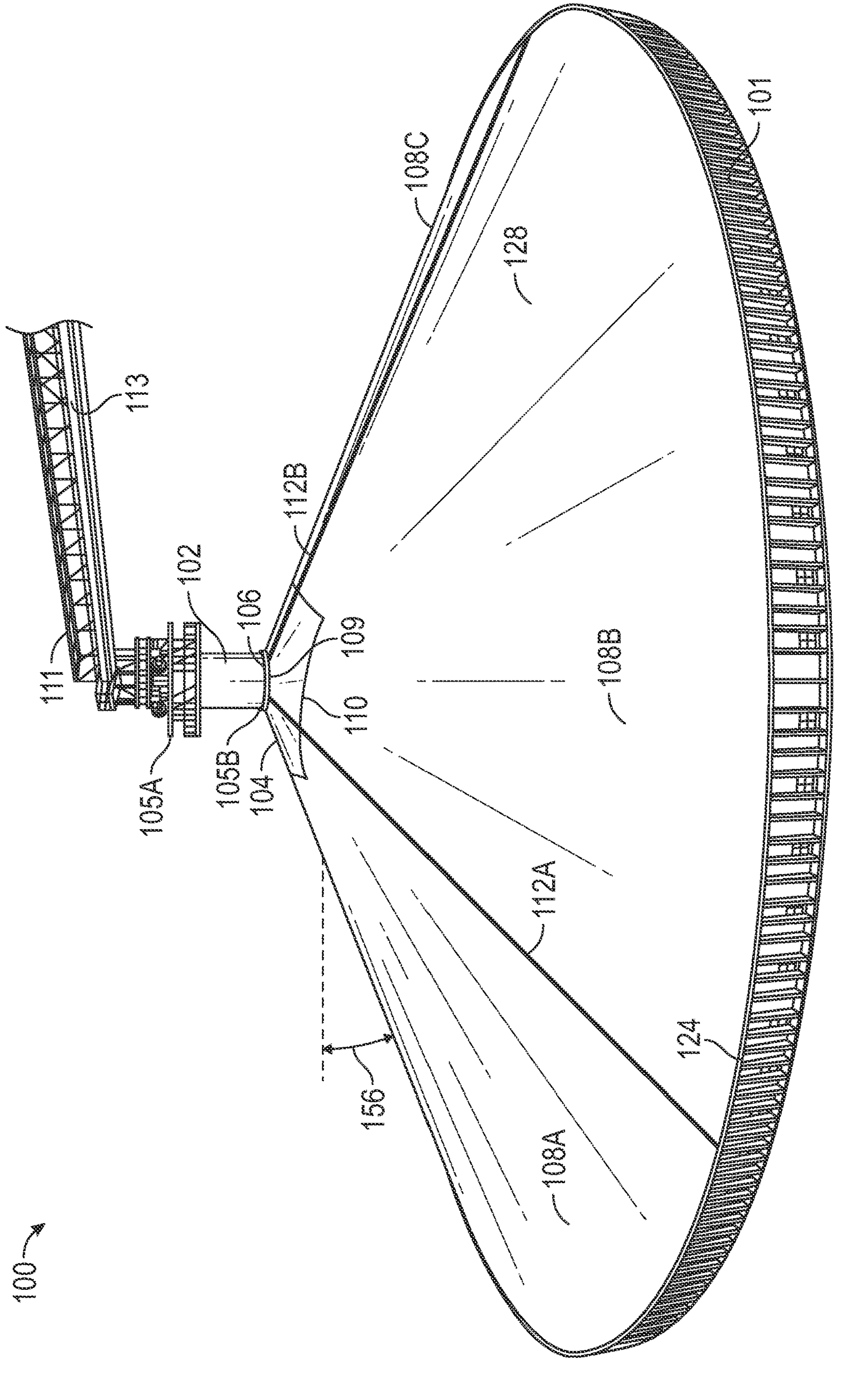
FIG. 1 is a pictorial representation showing the conical shape of a fill under tarp.
Figure 2:
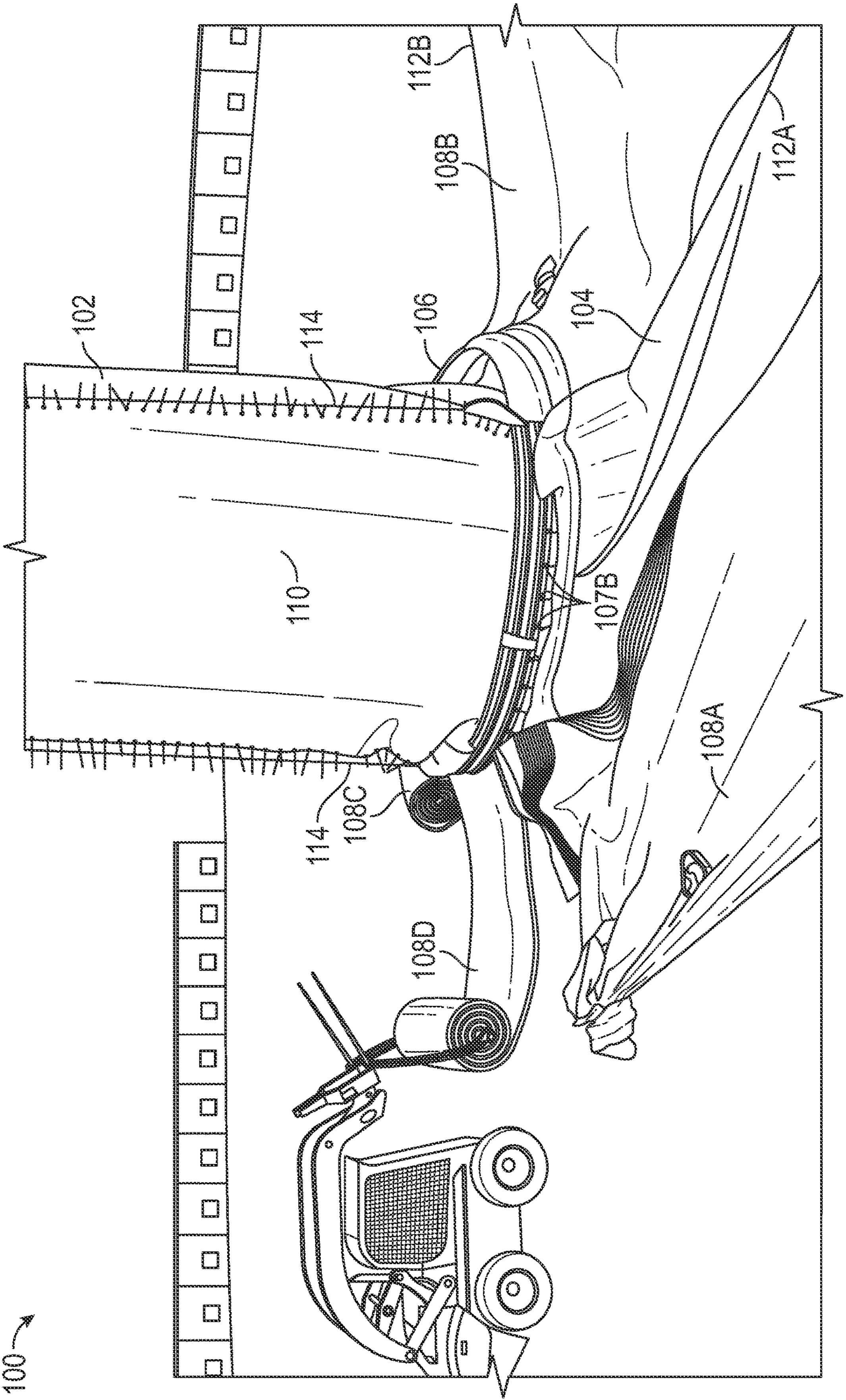
FIG. 2 is a pictorial representation showing assembly of a fill under tarp to a center tower skirt.
Figure 3:
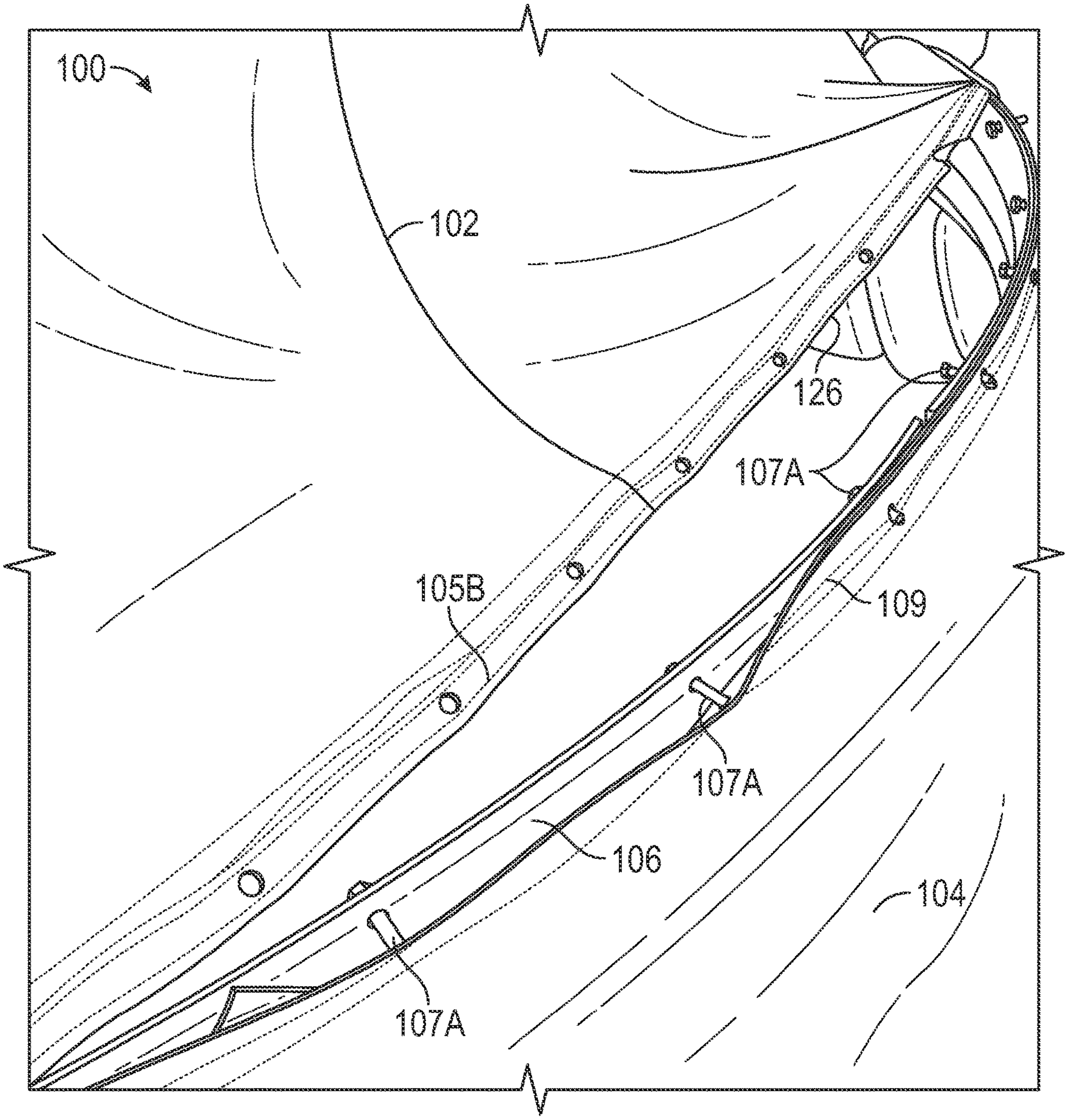
FIG. 3 is a pictorial representation showing assembly of a lift ring to sections of the fill under tarp.

Grain covers, such as a fill under tarp 100 system, are used to cover stored grain 132 (e.g., corn, soybean, milo, and wheat) as illustrated in the FIGS. 1-11. Types of fill under tarp 100 materials and thicknesses can vary. Material selection and thickness can depend on a range of factors, such as, for example, the use environment, application, desired life and durability, cost, and the material location (e.g., yoke, tarp body, center tower skirt, etc.) within the fill under tarp 100. Generally, fill under tarp 100 systems are fabricated with heavier materials than tarp after filling systems.

Fill under tarp 100 can be used in combination with a barrier wall 101 for forming a bunker 103. An outer terminal edge 124 of the body 128 of the tarp 100 can be secured to the barrier wall 101 with battening for enclosing the volume underneath the fill under tarp 100. The outer terminal edge 124 is shown, for example, by a line that approximates the outer edge of each of the tarp panels 114. The barrier wall 101 is typically constructed from concrete or steel for forming the bunker 103. Battening (not shown) is generally attached to the upper portion of the barrier wall 101 for securing the outer terminal edge 124 to the barrier wall 101.

At least one type of fill under tarp 100 can include a center tower skirt 102, which grain is fed through into the conically shaped volume underneath the tarp 100, using a grain conveyor 113 supported by one or more tower structures 111. The center tower skirt 102 has a generally circular outer circumference extending between an upper edge 105A and a lower edge 105B. The upper edge 105A of the center tower skirt 102 is operably secured to the tower structure 111. The lower edge 105B of the center tower skirt 102 is operably attached to a lift ring 106 via bolts (107A) or other means. The lift ring 106 can be fabricated from steel, aluminum, composite, or other suitable, generally stiff materials. The lift ring 106 is typically circular in shape and approximates the outer circumference of the opening 126 at the lower edge 105B of the center tower skirt 102.

A yoke 104 forming an inward or center portion of the tarp 100 is often secured to the lift ring 106, such as, for example, using a plurality of hooks 107B. Other attachment mechanisms can be employed to secure the yoke 104 to the lift ring 106 and center tower skirt 102. Similarly, an inner edge 109 of the yoke 104 is also secured to the lift ring 106 and the center tower skirt 102 with bolts 107A. Other attachment mechanisms can be employed to secure the inner edge 109 of the yoke 104 to the lift ring 106 and center tower skirt 102. The lift ring 106 is supported vertically by cables 114 connected to and extending between the tower structure 111 and the lift ring 106. The tarp 100 is generally conical in shape and generally has a preferred angle, or an angle of repose 156 for the specific type of grain material, of approximately 21 degrees or thereabout relative to a horizontal plane, as shown in FIG. 1, when the volume underneath the tarp 100 is filled. The angle can vary, such as, for example, less than 21 degrees (e.g., 18, 19, 20 degrees) or more than 21 degrees (e.g., 22, 23, 24 degrees).

Figure 4:
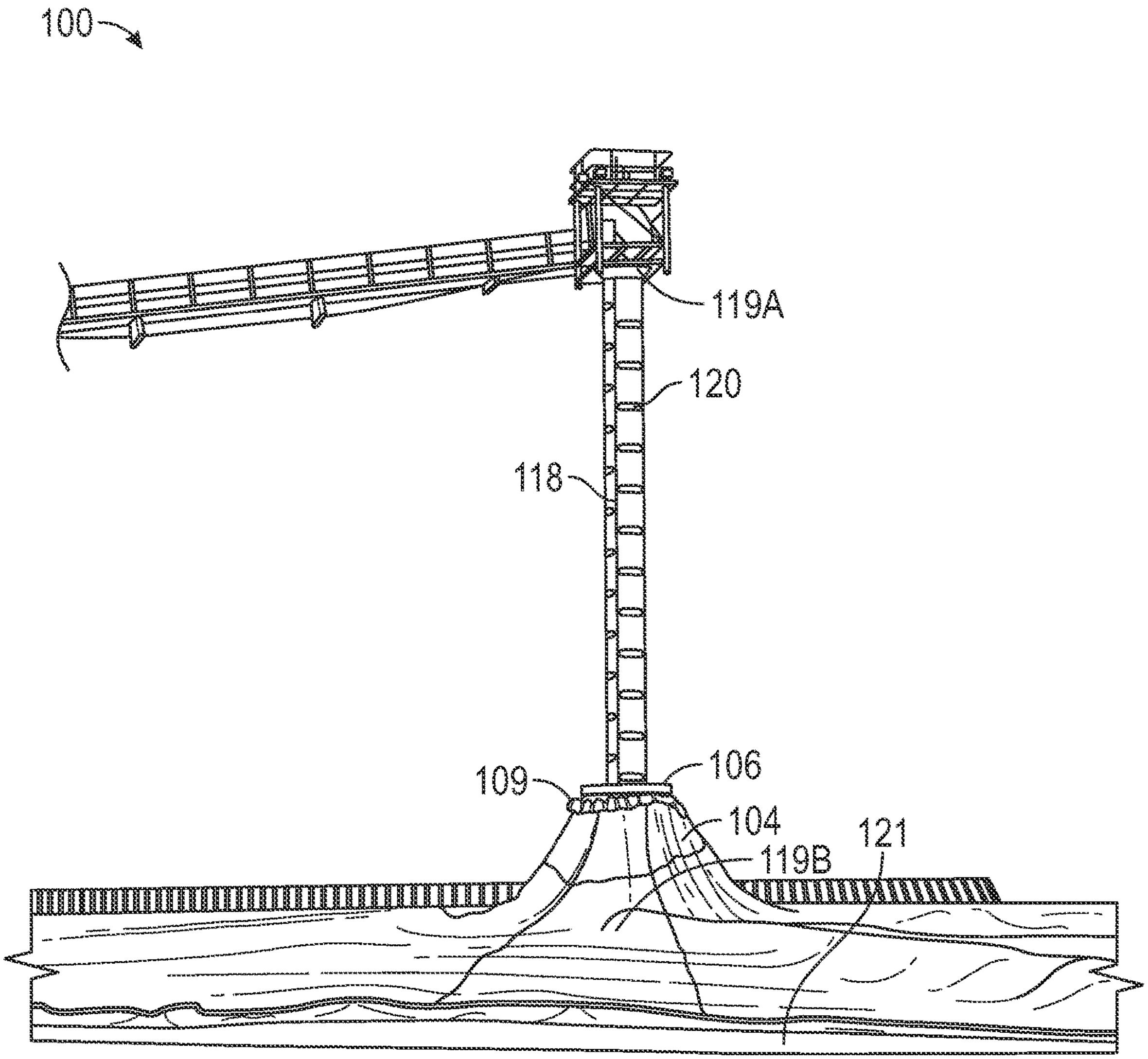
FIG. 4 is a pictorial representation of another fill under tarp configuration.

The center tower skirt 102 can be an optional feature based on the type of tower structure 111. For example, as shown in FIG. 4, a center tower structure 118 with mechanical steel doors 120 can be used in place of the center tower skirt 102. The center tower structure 118 has a top end 119A operably secured to the tower structure 111 and a bottom end 119B operably supported by the ground 121. The tarp 100 is hoisted from the bottom end 119B toward the top end 119A and supported vertically near the top end 119A with cables 114 connected to and extending between the tower structure 111 and the lift ring 106. In this configuration, grain travels along the grain conveyor 113 supported by the tower structure 111 and is fed through the center tower structure 118, from the top end 119A toward the bottom end 119B, out the mechanical steel doors 120 generally in ascending order, and into the conically shaped volume underneath the tarp 100. The tarp 100 is generally conical in shape and generally has a preferred angle of 21 degrees or thereabout relative to horizontal, as shown in FIG. 1, when the tarp 100 is hoisted and supported vertically and the conical volume underneath the tarp 100 is filled.

The body 128 of tarp 100 is often assembled from multiple sections of tarp material, which are typically separately manufactured and joined at a scam during the assembly process to form the fill under tarp 100. The body 128 of the tarp 100 is further detailed in the proceeding description.

The yoke 104 is generally fabricated from a thicker material and offers additional strength over the material forming the body 128 of the tarp 100. The yoke 104 is also typically square in shape whereas the assembled body 128 of the tarp 100 is generally conical in shape. The yoke 104 is generally more expensive than the body 128 of the tarp 100 due to the type, thickness, and construction of the yoke 104. The yoke 104 generally constitutes less than half of the area of the body 128 of the tarp 100. Most often the yoke 104 constitutes less than 30% of the area of the body 128 of the tarp 100. Increasing the size of the yoke 104 relative to the body 128 of the tarp 100 can significantly increase the cost of the fill under tarp 100. The yoke 104 can be fabricated in shapes other than a square shape, such as a shape without corners or one with obtuse angles. For example, the yoke 104 is fabricated having outer edges, such as a circular outer circumference, larger in diameter than the inner edge 109 of yoke 104. Additionally, the yoke 104 can be fabricated having an outer edge with a polygonal outer circumference. In a preferred aspect, the yoke 104 is square shaped for case of manufacturability, increased strength, to align corners of the yoke 104 with seams between the different tarp sections of the body 128 of the tarp 100, and to position the transition seam 110 away from the inner edge 109 of the yoke 104. In another preferred aspect, the yoke 104 is oriented relative to the different tarp sections of the body 128 of the tarp 100 to intentionally position portions of the yoke 104 and transition seam 110 that are likely to experience higher stress, such as during use, furthest away from the inner edge 109 of yoke 104. For purposes of the disclosure, seam is defined as the joint between and joining of two of the same types of material, whereas transitional scam is defined as the joint between and the joining of two different types of material. Joints between two types of the same or different materials can be joined using stitching, welding together with heat, and/or securing together with an adhesive, or other means.

The yoke 104 is secured to each section of the body 128 of the tarp 100 at a transition seam 110. Joining the material of the yoke 104 with the material for each section of the body 128 of the tarp 100 can be achieved by sewing together with stitching, welding together with heat, and/or securing together with an adhesive. The body 128 of the tarp 100 can be configured and assembled from any number of tarp sections. Thus, in at least one aspect, the yoke 104 is secured to each of the any number of tarp sections at the transition scam 110. In one configuration, tarp quarter sections 108A, 108B, 108C, 108D are secured or assembled at scams 112A, 112B, 112C, 112D to form the body 128 of the tarp 100. Each tarp section 108A, 108B, 108C, 108D is generally assembled from a plurality of commonly aligned and commonly extending tarp panels 114. Thus, the tarp panels 114 have at least one side and/or end secured to the yoke 104 at the transition seam 110. The tarp panels 114 may not be commonly aligned and commonly extending in at least one aspect, but each panel 114 still has at least one side and/or end secured to the yoke 104 at the transition scam 110.

Figure 9:
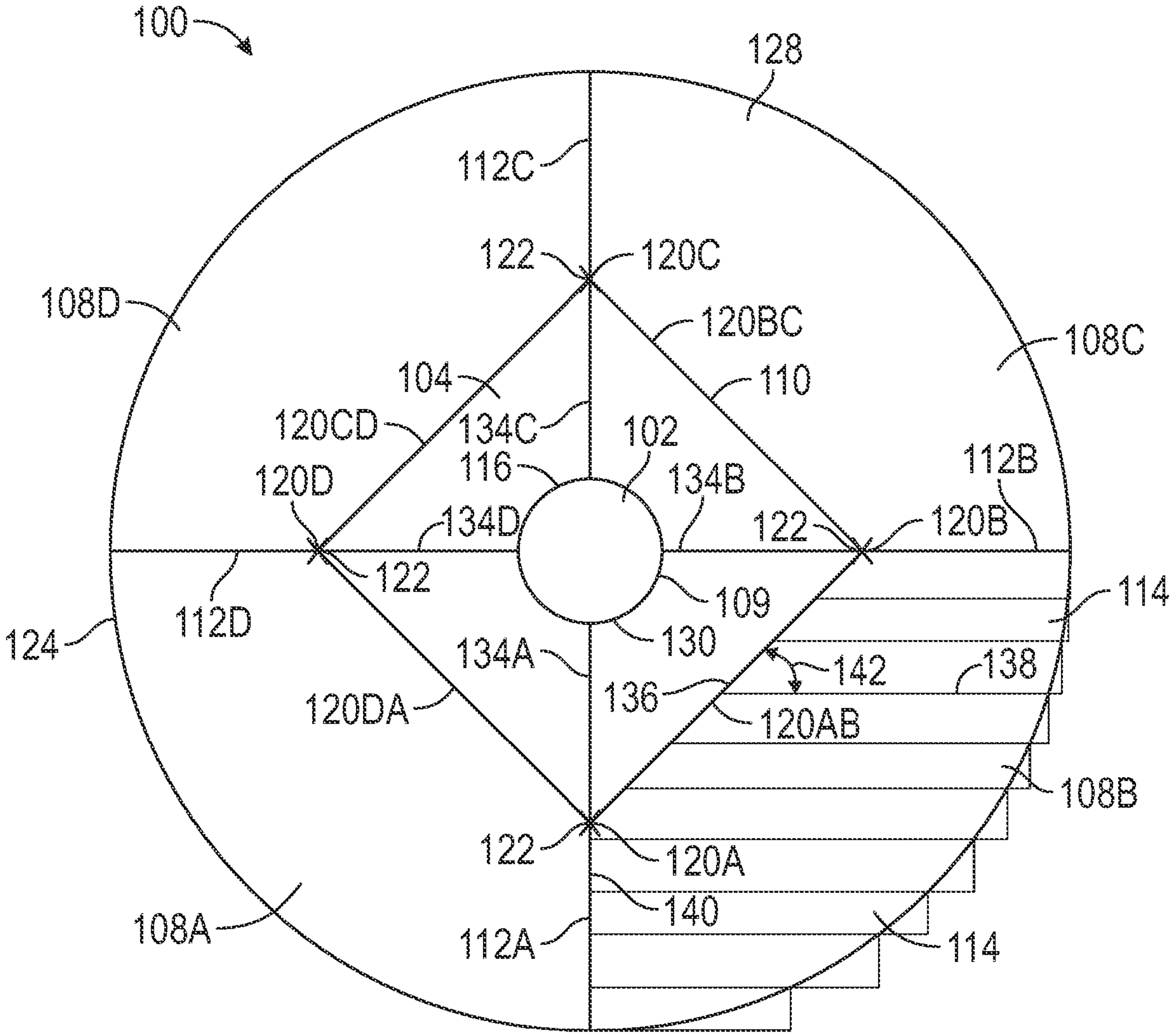
FIG. 9 is a pictorial representation shown from a top view perspective illustrating another yoke configuration for a fill under tarp.
Figure 10:
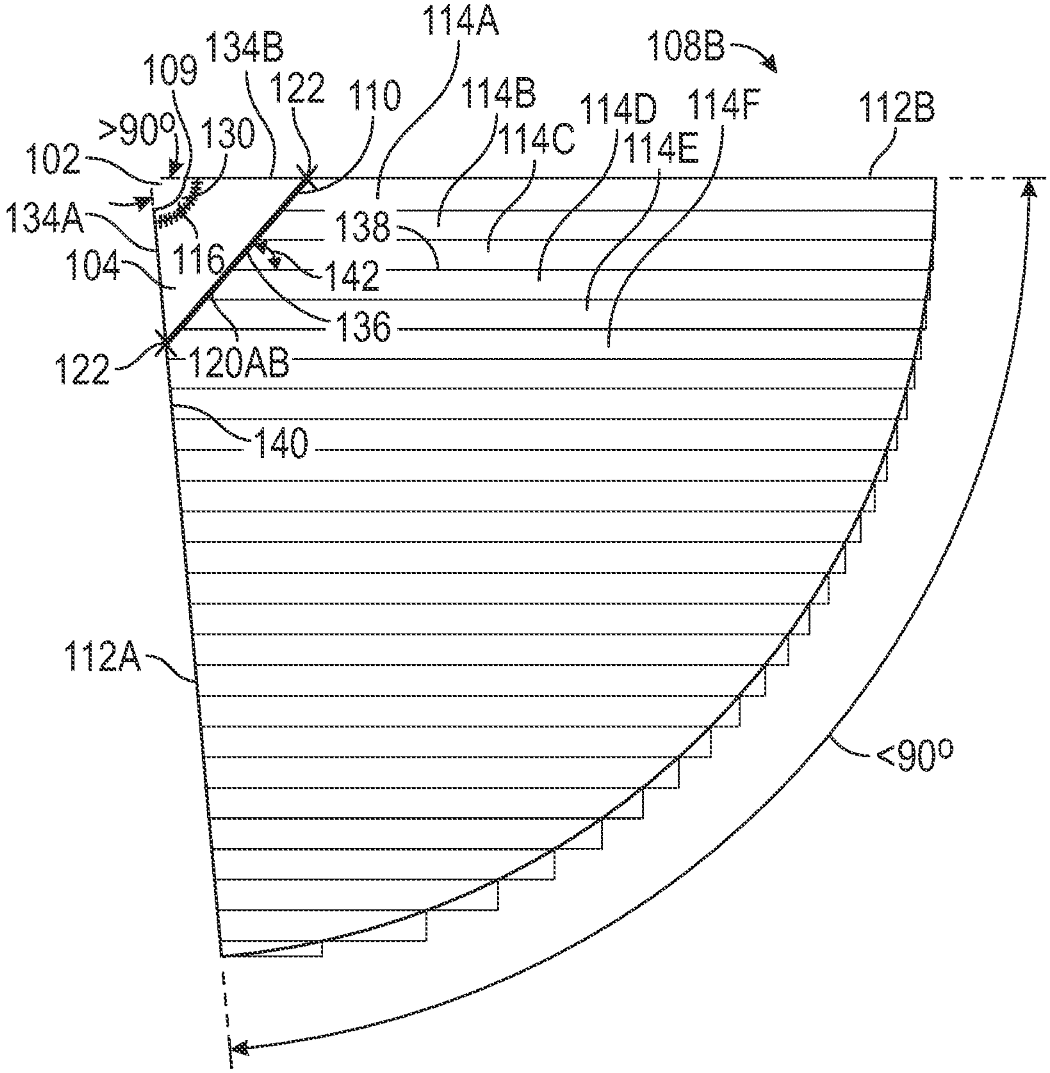
FIG. 10 is a pictorial representation of a yoke and corresponding tarp section.

The orientation of the yoke 104 relative to each tarp section and each panel 114 ultimately determines the number of tarp panels 114 and the length of the edge of each tarp panel 114 that is connected to the yoke 104 at the transition seam 110. In a preferred aspect, the yoke 104 orientation is configured to increase the number of tarp panels 114 and the length of the edge of each tarp panel 114 that is connected to the yoke 104 at the transition seam 110 to increase the strength of and lessen the likelihood of failure at the transition scam 110. FIGS. 9-10 provide an illustration for orienting a square shaped yoke 104 relative to each tarp section 108A, 108B, 108C, 108D and panels 114.

Figure 5:
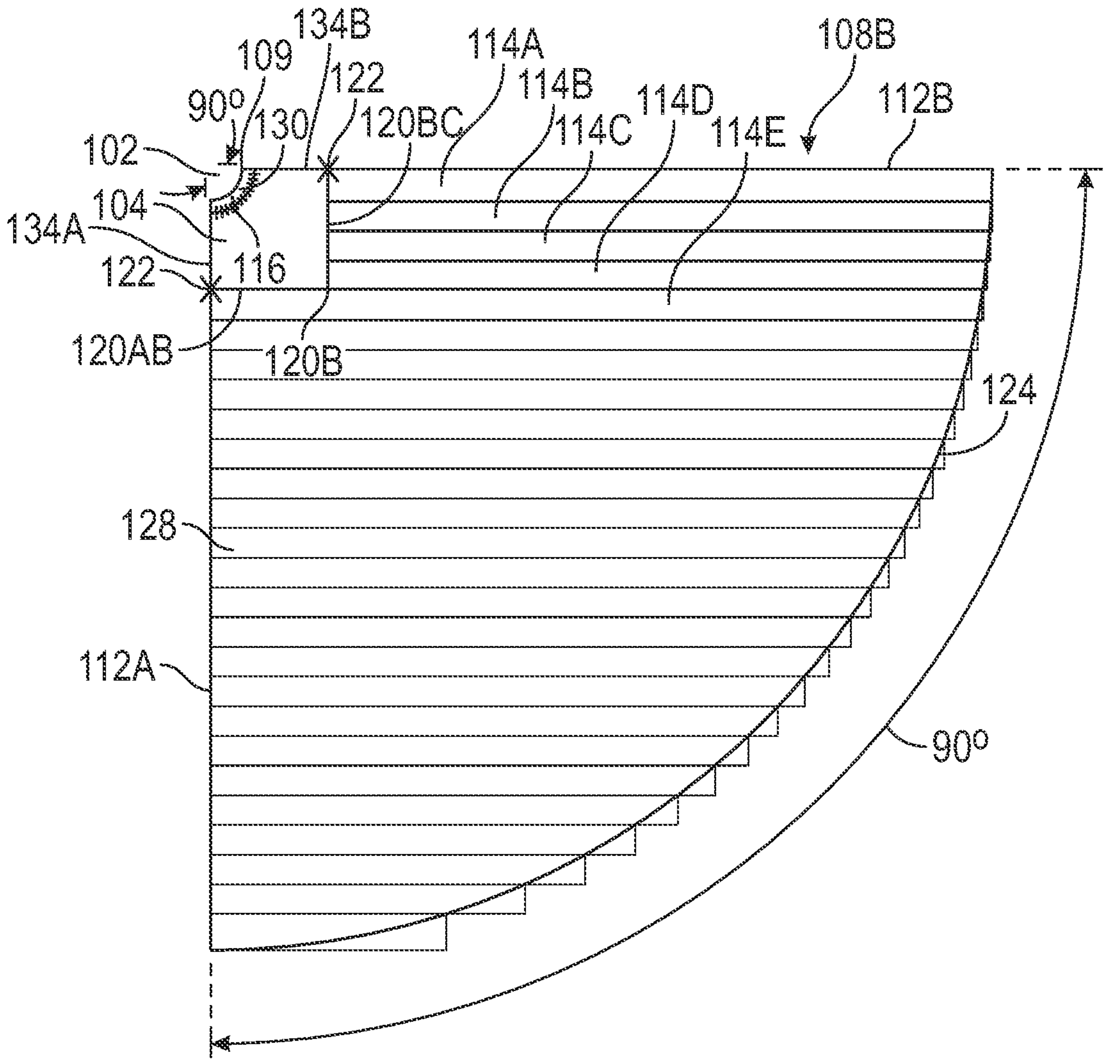
FIG. 5 is a pictorial representation of a tarp section.

The number of tarp panels 114 and the length of the edge of each tarp panel 114 that is connected to the yoke 104 at the transition seam 110 can be optimally configured to distribute the stresses more evenly at the transition seam 110 by altering the orientation of the yoke 104 relative to each tarp quarter section 108A, 108B, 108C, 108D. For example, FIG. 5 provides an illustration presenting a single section 108B of the body 128 of a fill under tarp 100 for simplification purposes. In a preferred aspect, the other sections of the body 128 of the tarp 100 are generally identical (e.g., see, for example, FIGS. 8-9) and thus are not illustrated in FIGS. 5-6. In another aspect, the other sections of the body 128 of the tarp 100 can be configured differently from one another. Looking at a single quarter section 108B of tarp 100, as shown in FIG. 5, a total of five tarp panels 114A-114E are connected to the yoke 104 along the transition seam at the edge 120BC and the edge 120AB of the yoke 104. Tarp panels 114A-114D are connected to the edge 120BC of the yoke 104 at transition seam 110. Tarp panel 114E is connected to the edge 120AB of the yoke 104 at transition seam 110. In one aspect, the length of transition seam 110 corresponding to the edge 120AB and edge 120BC of the yoke 104 are equal. In another aspect, the length of transition seam 110 corresponding to the edge 120AB and 120BC of the yoke 104 are unequal. For example, the length of the edge 120BC of the yoke 104 at the transition seam 110 is secured to each of the lengths of the edge of the four panels 114A-114D, whereas the length of the edge 120AB of the yoke 104 at the transition seam 110 is secured to a side edge of the single panel 114E. In this configuration, the load and resulting stresses present during use of the fill under tarp 100 at the edge 120BC of the transition scam 110 is generally carried by each of the lengths of the edge of the four panels 114A-114D. Likewise, the load and the resulting stresses present during use of the fill under tarp 100 at the edge 120AB of the transition seam 110 is generally carried by a side edge of the single panel 114E. The number of tarp panels 114 connected to the edges (e.g., 120AB, 120BC, 120CD, and 120DA) of the yoke 104 at transition seam 110 can be increased by decreasing the width of each tarp panel or increasing the size of the yoke 104. Conversely, the number of tarp panels 114 connected to the edges (e.g., 120AB, 120BC, 120CD, and 120DA) of the yoke 104 at transition seam 110 can be decreased by increasing the width of each tarp panel 114 or decreasing the size of the yoke 104. In one preferred aspect, the yoke 104 is configured and/or oriented to maximize the number of tarp panels 114 connected to the yoke 104 to increase the strength of transition seam 110. In another preferred aspect, the yoke 104 is configured and/or oriented to maximize the number of tarp panels 114 connected to a single edge (e.g., 120AB, 120BC, 120CD, and 120DA) of the yoke 104 in a single section (e.g., 108A, 108B, 108C, and 108D) of the body 128 of the tarp 100 to increase the strength of transition seam 110.

Figure 6:
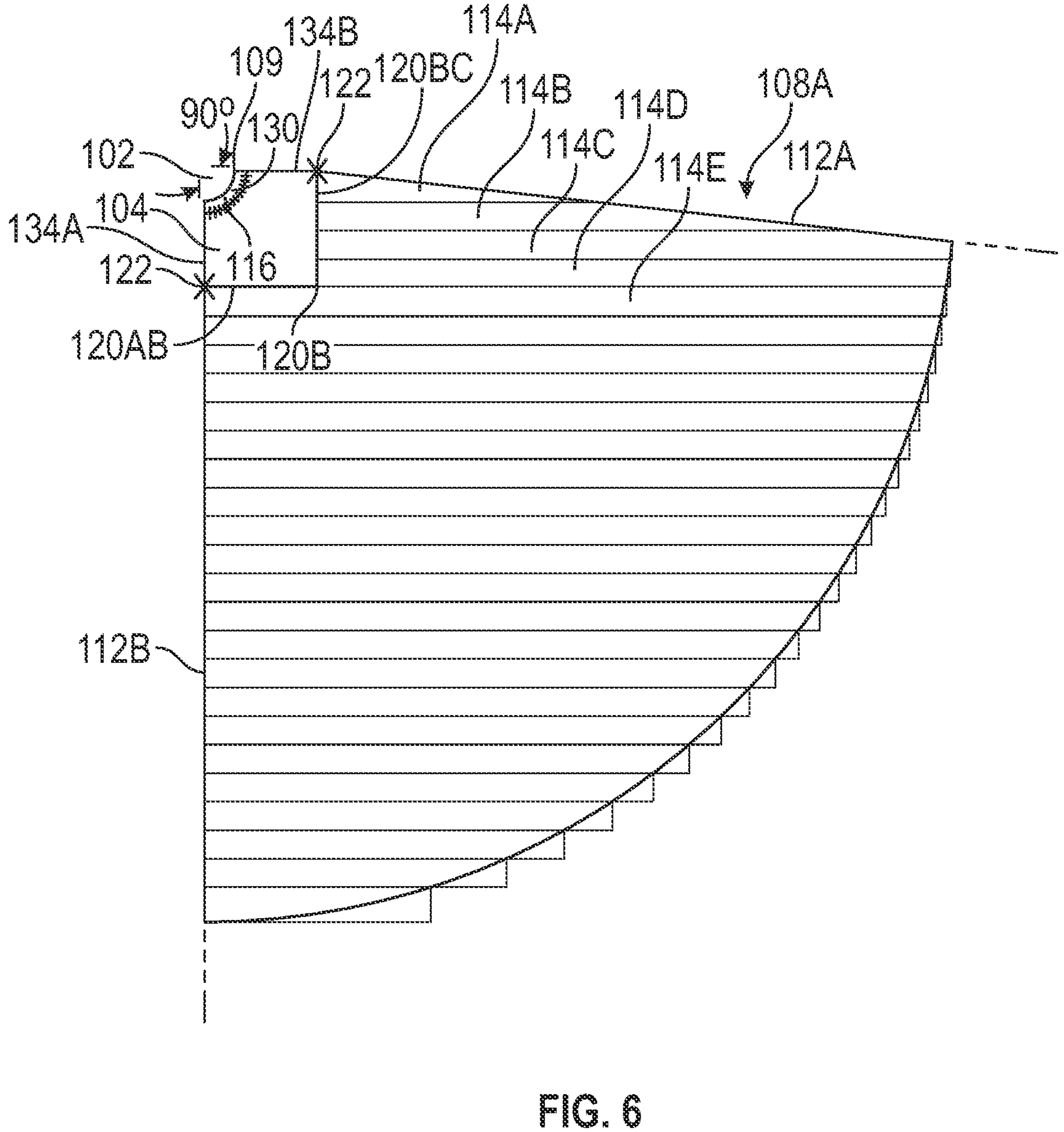
FIG. 6 is another pictorial representation of a tarp section.

Section 108B of the body 128 and yoke 104 of the tarp 100 is configured, for example, in at least one aspect, with seams 112A and 112B being oriented 90 degrees relative to each other. Sections 108A, 108C, and 108D can be similarly configured. Seams 112A and 112B of both the yoke 104 and tarp body 128 of section 108B can be less than or greater than 90 degrees. Sections 108A, 108C, and 108D can be similarly configured. In at least one preferred aspect, seams 112A and 112B of section 108B of the tarp body 128 are less than 90 degrees and seams 112A and 112B of the yoke 104 are 90 degrees (FIG. 6). Sections 108A, 108C, and 108D can be similarly configured. In at least one other preferred aspect, each seam 112A and 112B are less than 90 degrees for both the yoke 104 and body 128 of section 108B of tarp 100. Sections 108A, 108C, and 108D can be similarly configured. In still another aspect, each section 108A, 108B, 108C, 108D or one or more of each of the sections 108A, 108B, 108C, 108D has seams along the body 128 of tarp 100 that are oriented at 90 degrees, greater than 90 degrees, or less than 90 degrees. In yet another aspect, each section 108A, 108B, 108C, 108D or one or more of each of the sections 108A, 108B, 108C, 108D has scams along the yoke 104 of tarp 100 that are oriented at 90 degrees, greater than 90 degrees, or less than 90 degrees. In another aspect, each section 108A, 108B, 108C, 108D or one or more of each of the sections 108A, 108B, 108C, 108D has seams along both the body 128 and the yoke 104 of tarp 100 that are oriented at 90 degrees, greater than 90 degrees, or less than 90 degrees.

The outer terminal edge 124 defining the outer circumference of the body 128 of tarp 100 can be altered as needed by increasing the length of seams 112A, 112B, 112C, and 112D for each section 108A, 108B, 108C, and 108D. The arc length of each or one or more of each of the sections 108A, 108B, 108C, and 108D can be changed, for example, in at least one aspect, by altering the angle between seams 112A, 112B, 112C, and 112D. The outer circumference of the outer terminal edge 124 of the body 128 of the tarp 100 can be increased and decreased by altering the angle between seams of each or one or more of each of the sections 108A, 108B, 108C, and 108D. For example, decreasing the angle (e.g., less than 90 degrees) between seams of each or one or more of each of the sections 108A, 108B, 108C, and 108D decreases the circumference of the outer terminal edge 124 of the body 128 of the tarp 100. Conversely, increasing the angle (e.g., more than 90 degrees) between seams of each or one or more of each of the sections 108A, 108B, 108C, and 108D increases the circumference of the outer terminal edge 124 of the body 128 of the tarp 100. Increasing the angle between seams of each or one or more of each of the sections 108A, 108B, 108C, and 108D of the body 128 of the tarp 100 increases the amount of material used and increases the circumference of the outer terminal edge 124 of the body 128 of the tarp 100. Conversely, decreasing the angle between seams of each or one or more of each of the sections 108A, 108B, 108C, and 108D of the body 128 of the tarp 100 decreases the amount of material used and decreases the circumference of the outer terminal edge 124 of the body 128 of the tarp 100. In a preferred aspect, the angle between seams of each or one or more of each of the sections 108A, 108B, 108C, and 108D of the body 128 of the tarp 100 is decreased (e.g., less than 90 degrees) to decrease the amount of material used and to decrease the circumference of the outer terminal edge 124 of the body 128 of the tarp 100 and so the overall shape of the body 128 of the fill under tarp 100 better approximates the conical shaped pile of grain.

Figure 7:
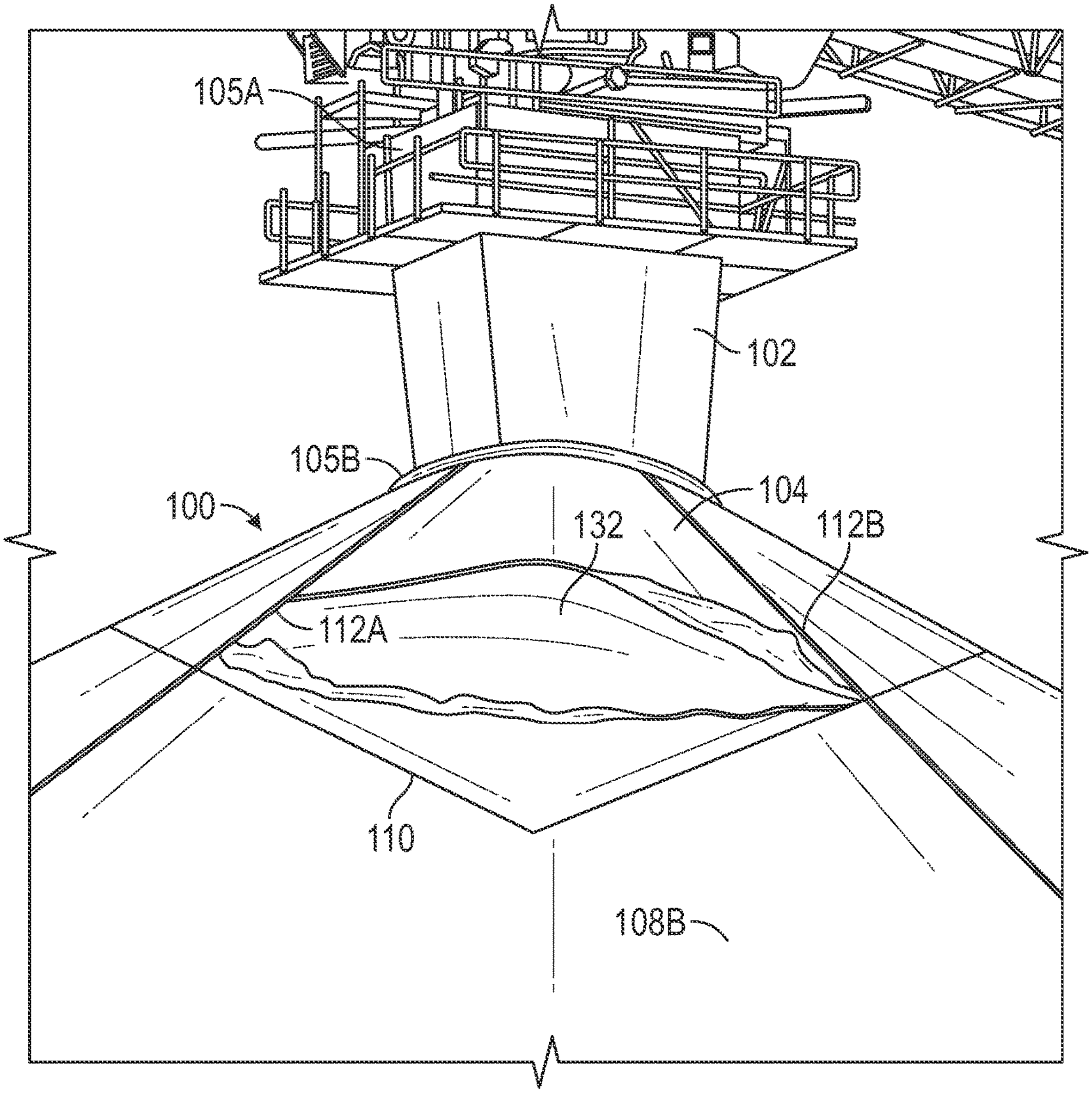
FIG. 7 is a pictorial representation illustrating failure of a fill under tarp.

FIG. 7 provides an illustration showing failure of a fill under tarp 100. In one example, the load and the resulting stresses present during use of the fill under tarp 100 causes separation at one or more of the seams and/or one or more of the transition seams. In FIG. 7, failure points are shown and exist along both seam 112A and transition seam 110. One failure mode can occur when the transition seam 110 separates from the load and resulting stresses present during use of the fill under tarp 100. Another failure mode can occur when the transition seam 110 separates resulting in a separation of scam 112A. Still another failure mode can occur when seam 112B separates from the load and resulting stresses present during use of the fill under tarp 100. Yet another failure mode can occur when seam 112A separates resulting in a separation of transition seam 110. Although scams 112A and 112B are specially referred to in FIG. 7, it is understood that failure could be applicable to any seam (e.g., 112A, 112B, 112C, and 112D) of the fill under tarp 100. Similarly, although transition seam 110 is specifically referred to in FIG. 7, it is understood that transition seam 110 can refer to the transition seam associated with any of the edges (e.g., edges 120AB, 120BC, 120CD, and 120DA) of the fill under tarp 100.

Figure 8:
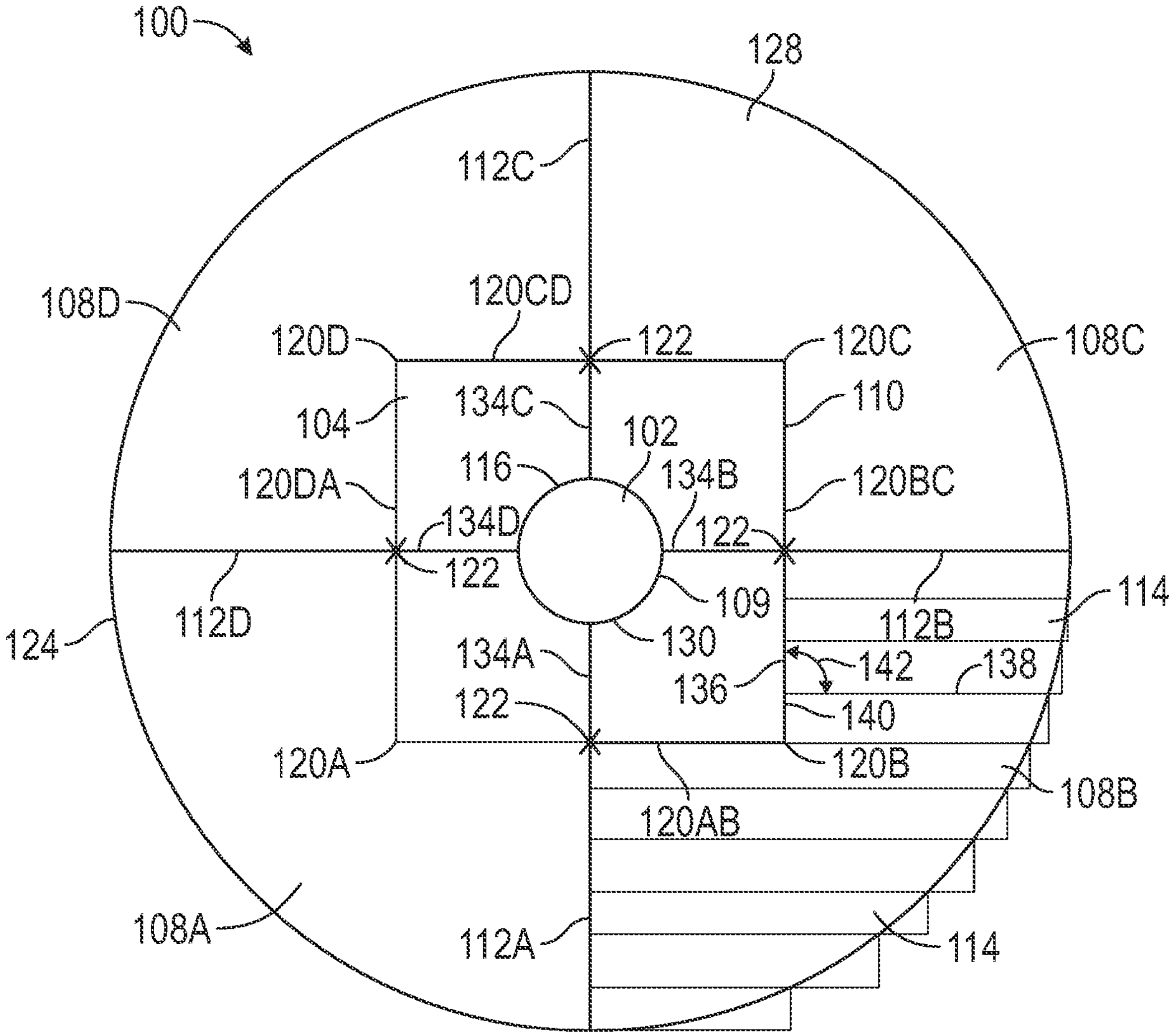
FIG. 8 is a pictorial representation shown from a top view perspective illustrating a yoke configuration for a fill under tarp.

FIG. 8 is a pictorial representation shown from a top view perspective illustrating a configuration for the yoke 104 of a fill under tarp 100. The tarp 100 includes sections 108A, 108B, 108C, and 108D joined at seams 112A, 112B, 112C, and 112D extending from the outer terminal edge 124 of the body 128 of the fill under tarp 100 to the edges (e.g., 120AB, 120BC, 120CD, and 120DA) of the yoke 104 of the fill under tarp 100. The body 128 of the tarp 100 can include any number of sections. In one aspect, the body 128 of the tarp 100 includes more than four sections (e.g., more than sections 108A, 108B, 108C, and 108D). In another aspect, the body 128 of the tarp 100 includes less than four sections (e.g., less than sections 108A, 108B, 108C, and 108D). Each section is configured from panels 114 (FIG. 8). The yoke 104 is generally configured as a separate member of the body 128 of the tarp 100, and typically fabricated from a different type of material than sections 108A, 108B, 108C, and 108D of the body of the tarp 100. The yoke 104 can be circular, oval, rectangular, or polygonal in shape and is preferably square in shape. The yoke 104 can include yoke seams 134A, 134B, 134C, and 134D extending between the inner edge 109 and respective corners 120A, 120B, 120C, and 120D. The yoke 104 includes edge 120AB spaced and extending between corner 120A and corner 120B, edge 120BC spaced and extending between corner 120B and corner 120C, edge 120CD spaced and extending between corner 120C and corner 120D, and edge 120DA spaced and extending between corner 120D and corner 120A. The yoke 104 includes an opening 130 disposed at the center of the body 128 of the tarp 100. The opening 130 can be spaced equidistant between opposing edges 120BC and 120DA and opposing edges 120AB and 120CD. In one aspect, the inner edge 109 of the opening 130 of the yoke 104 is colinear with the inner edge 116 of the body 128 of tarp 100. In other aspects, the inner edge 109 of the opening 130 is not colinear with the inner edge 116 of the body 128 of the tarp 100. The yoke 104 is positioned and configured relative to the body 128 of the tarp 100 whereby a portion of edge 120AB and a portion of edge 120BC lie in section 108B, whereby a portion of edge 120BC and a portion of edge 120CD lie in section 108C, whereby a portion of edge 120CD and a portion of edge 120DA lie in section 108D, and whereby a portion of edge 120DA and a portion of edge 120AB lie in section 108A. Edge 120AB is joined to section 108A and section 108B along transition seam 110, edge 120BC is joined to section 108B and section 108C along transition seam 110, edge 120CD is joined to section 108C and section 108D along transition seam 110, and edge 120DA is joined to section 108D and section 108A along transition seam 110. The yoke 104 can be layered, for example, on top of or beneath the body 128 of tarp 100. In another aspect, the yoke 104 is not layered with the body 128 of tarp 100. For example, seam 112A can be configured to extend from the outer terminal edge 124 of the body 128 of the tarp 100 to the edge 120AB of the yoke 104, seam 112B can be configured to extend from the outer terminal edge 124 of the body 128 of the tarp 100 to the edge 120BC of the yoke 104, scam 112C can be configured to extend from the outer terminal edge 124 of the body 128 of the tarp 100 to the edge 120CD of the yoke 104, and scam 112D can be configured to extend from the outer terminal edge 124 of the body 128 of the tarp 100 to the edge 120DA of the yoke 104. Similarly, the yoke 104 of the tarp 100 can be configured whereby the edges 120AB, 120BC, 120CD, and 120DA are colinear with and joined along the transition seam 110 with respective sections 108B, 108C, 108D, and 108A. The orientation of the yoke 104 relative to the body 128 of the tarp 100 determines the distance of the transition seam 110 from the inner edge 109 of the yoke 104 of the tarp 100. Additionally, the orientation of the yoke 104 relative to the body 128 of the tarp 100 determines the distance from the intersection point marked by the "X" 122 between the transition seam 110 and the seams 112A, 112B, 112C, and 112D and the inner edge 109 of the yoke 104 of the tarp 100. As mentioned herein, one failure mode can occur when the transition seam 110 separates from the load and resulting stresses present during use of the fill under tarp 100. Another failure mode can occur when the transition seam 110 separates resulting in a separation and failure of seam 112B or other seams. Still another failure mode can occur when seam 112B or other seams separate from the load and resulting stresses present during use of the fill under tarp 100. Yet another failure mode can occur when seam 112B or other seams separate resulting in a separation of transition seam 110. As shown in FIG. 5 and FIG. 8, the corner 120B is disposed further away from the inner edge 109 of the yoke 104 than the intersection points "X" 122 between the transition seam 110 and the seams 112A, 112B, 112C, and 112D. Positioning the intersection point "X" 122 further away from the inner edge 109 of the yoke 104 or closer to the outer terminal edge 124 of the body 128 of the tarp 100 significantly reduces the chance of failure of the tarp 100 from the load that results from the stresses present during use of the fill under tarp 100. FIG. 5 pictorially illustrates the panels 114 (e.g., 114A, 114B, 114C, 114D, 114E) for each of the sections 108A, 108B, 108C, and 108D of the body 128 of the tarp 100 shown in FIG. 8. The number of tarp panels 114 and the length of the edge of each tarp panel 114 that is connected to the yoke 104 at the transition seam 110 can be optimally configured to distribute the stresses more evenly at the transition seam 110 by altering the orientation of the yoke 104 relative to section 108A, 108B, 108C, and 108D. In at least one aspect, the angled edge 136 of each tarp panel 114 connected to the yoke 104 has an angle 142 equal to or less than 90 degrees relative to the longitudinal edge 138 of each tarp panel 114. For example, the angle 142 of the angled edge 136 of each tarp panel 114 joined to the yoke 104 can be 90 degrees relative to the longitudinal edge 138 of each tarp panel 114 but is preferably less than 60 degrees and greater than 30 degrees. The longitudinal edge 138 of each tarp panel 114 can be parallel with seam 112B and the lateral edge 140 can be perpendicular with seam 112A. The same relationships for the lateral 140 and longitudinal edges 138 with scams 112A, 112B, 112C, and 112D applies to the other sections 108A, 108C, and 108D. Looking at a single quarter section 108B of tarp 100, as shown in FIG. 5, a total of five tarp panels 114A-114E are connected to the yoke 104 along the transition seam at the edge 120BC and the edge 120AB of the yoke 104. In at least one aspect, tarp panels 114A-114D are connected to the edge 120BC of the yoke 104 at transition seam 110, and tarp panel 114E is connected to the edge 120AB of the yoke 104 at transition seam 110. In one aspect, the length of transition seam 110 corresponding to the edge 120AB and edge 120BC of the yoke 104 are equal. In another aspect, the length of transition seam 110 corresponding to the edge 120AB and 120BC of the yoke 104 are unequal. For example, the length of the edge 120BC of the yoke 104 at the transition seam 110 is secured to each of the lengths of the edge of the four panels 114A-114D, whereas the length of the edge 120AB of the yoke 104 at the transition seam 110 is secured to a side edge of the single panel 114E. In this configuration, the load and resulting stresses present during use of the fill under tarp 100 at the edge 120BC of the transition seam 110 is generally carried by each of the lengths of the edge of the four panels 114A-114D. Likewise, the load and the resulting stresses present during use of the fill under tarp 100 at the edge 120AB of the transition scam 110 is generally carried by a side edge of the single panel 114E. The number of tarp panels 114 connected to the edges (e.g., 120AB, 120BC, 120CD, and 120DA) of the yoke 104 at transition scam 110 can be increased by decreasing the width of each tarp panel or increasing the size of the yoke 104. Conversely, the number of tarp panels 114 connected to the edges (e.g., 120AB, 120BC, 120CD, and 120DA) of the yoke 104 at transition seam 110 can be decreased by increasing the width of each tarp panel 114 or decreasing the size of the yoke 104. In one preferred aspect, the yoke 104 is configured and/or oriented to maximize the number of tarp panels 114 connected to the yoke 104 to increase the strength of transition seam 110. In another preferred aspect, the yoke 104 is configured and/or oriented to maximize the number of tarp panels 114 connected to a single edge (e.g., 120AB, 120BC, 120CD, and 120DA) of the yoke 104 in a single section (e.g., 108A, 108B, 108C, and 108D) of the body 128 of the tarp 100 to increase the strength of transition seam 110.

FIG. 9 is a pictorial representation shown from a top view perspective illustrating a configuration for the yoke 104 of a fill under tarp 100. The tarp 100 includes sections 108A, 108B, 108C, and 108D joined at scams 112A, 112B, 112C, and 112D extending from the outer terminal edge 124 of the body 128 of the fill under tarp 100 to the edges (e.g., 120AB, 120BC, 120CD, and 120DA) of the body 128 of the fill under tarp 100. The yoke 104 can include yoke scams 134A, 134B, 134C, and 134D extending between the inner edge 109 and respective corners 120A, 120B, 120C, and 120D. The body 128 of the tarp 100 can include any number of sections. In one aspect, the body 128 of the tarp 100 includes more than four sections. In another aspect, the body 128 of the tarp 100 includes less than four sections. Each section is configured from panels 114. The yoke 104 can be circular, oval, rectangular, or polygonal in shape and is preferably square in shape. The yoke 104 includes edge 120AB spaced and extending in section 108B between corner 120A and corner 120B, edge 120BC spaced and extending in section 108C between corner 120B and corner 120C, edge 120CD spaced and extending in section 108D between corner 120C and corner 120D, and edge 120DA spaced and extending in section 108A between corner 120D and corner 120A. The yoke 104 includes an opening 130 disposed at the center of the body 128 of the tarp 100. The opening 130 can be spaced equidistant between opposing edges 120BC and 120DA and opposing edges 120AB and 120CD. In one aspect, the inner edge 109 of the opening 130 of the yoke 104 is colinear with the inner edge 116 of the body 128 of tarp 100. In other aspects, the inner edge 109 of the opening 130 is not colinear with the inner edge 116 of the body 128 of the tarp 100. The yoke 104 is positioned and configured relative to the body 128 of the tarp 100 whereby the edge 120AB lies in section 108B, whereby the edge 120BC lies in section 108C, whereby the edge 120CD lies in section 108D, and whereby the edge 120DA lies in section 108A. In at least one preferred aspect, section 108B extends from the outer terminal edge 124 and terminates at the edge 120AB, section 108C extends from the outer terminal edge 124 and terminates at the edge 120BC, section 108D extends from the outer terminal edge 124 and terminates at the edge 120CD, and section 108A extends from the outer terminal edge 124 and terminates at the edge 120DA. Edge 120AB is joined to section 108B along transition seam 110, edge 120BC is joined to section 108C along transition seam 110, edge 120CD is joined to section 108D along transition seam 110, and edge 120DA is joined to section 108A along transition seam 110. The yoke 104 can be layered, for example, on top of or beneath the body 128 of tarp 100. In another aspect, the yoke 104 is not layered with the body 128 of tarp 100. The yoke 104 can be connected with each section at respective edges 120AB, 120BC, 120CD, and 120DA. For example, seam 112A can be configured to extend from the outer terminal edge 124 of the body 128 of the tarp 100 to the intersection point "X" 122 of edge 120AB and edge 120DA of the yoke 104, seam 112B can be configured to extend from the outer terminal edge 124 of the body 128 of the tarp 100 to the intersection point "X" 122 of edge 120BC and edge 120AB of the yoke 104, scam 112C can be configured to extend from the outer terminal edge 124 of the body 128 of the tarp 100 to the intersection point "X" 122 of edge 120CD and edge 120BC of the yoke 104, and seam 112D can be configured to extend from the outer terminal edge 124 of the body 128 of the tarp 100 to the intersection point "X" 122 of edge 120DA and edge 120CD of the yoke 104. Similarly, the body 128 of tarp 100 can be configured whereby each section has edges colinear with and joined to the edge 120AB in section 108B, the edge 120BC in section 108C, the edge 120CD in section 108D, and the edge 120DA in section 108A. The orientation of the yoke 104 relative to the body 128 of the tarp 100 determines the distance of the transition seam 110 from the inner edge 109 of the yoke 104 of the tarp 100. For example, the orientation of the yoke 104 shown in FIG. 9 is rotated 45 degrees relative to the orientation of the yoke 104 shown in FIG. 8. The yoke 104 can be rotated greater than 45 degrees or less than 45 degrees, as needed, to position the intersection point "X" 122 further away from the inner edge 109 of the yoke 104 or closer to the outer terminal edge 124 of the body 128 of the tarp 100. In the configuration shown in FIG. 9, the yoke 104 is rotated whereby the intersection points "X" 122 aligned with each seam are positioned furthest away from the inner edge 109 of the yoke 104, whereas the transition scam 110 can be closer to the inner edge 109 of the yoke 104 between any two intersection points "X" 122. In one aspect, diagonals of a square-shaped yoke 104 align with seams 112A, 112B, 112C, and 112D. Additionally, the orientation of the yoke 104 relative to the body 128 of the tarp 100 determines the length of the transition seam 110 between any two intersection points "X" 122. In a preferred aspect, the yoke 104 is rotated so that the largest amount of length (e.g., linear length) of the transition seam 110 is disposed in any one single section of the body 128 of the fill under tarp 100. As mentioned herein, one failure mode can occur when the transition seam 110 separates from the load and resulting stresses present during use of the fill under tarp 100. Another failure mode can occur when the transition seam 110 separates resulting in a separation and failure of one or more of the scams (e.g., 112A, 112B, 112C, and 112D). Still another failure mode can occur when one or more of the seams (e.g., 112A, 112B, 112C, and 112D) separate from the load and resulting stresses present during use of the fill under tarp 100. Yet another failure mode can occur when one or more of the seams (e.g., 112A, 112B, 112C, and 112D) separate resulting in a separation of the transition seam 110 at one or more locations. As shown in FIG. 9 and FIG. 10, the corners 120A, 120B, 120C, and 120D are disposed further away from the inner edge 109 of the yoke 104 and are colinear with the intersection points "X" 122 representing the intersection between transition seam 110 and the seams 112A, 112B, 112C, and 112D. Positioning the intersection point "X" 122 further away from the inner edge 109 of the yoke 104 or closer to the outer terminal edge 124 of the body 128 of the tarp 100 significantly reduces the chance of failure of the tarp 100 from the load that results from the stresses present during use of the fill under tarp 100. FIG. 9 pictorially illustrates the panels 114 shown in section 108B. Similar panels 114, although not shown, would be present in all sections 108A, 108B, 108C, and 108D of the body 128 of the tarp 100. The number of tarp panels 114 and the length of the edge of each tarp panel 114 that is connected to the yoke 104 at the transition seam 110 can be optimally configured to distribute the stresses more evenly at the transition seam 110 by altering the orientation of the yoke 104 relative to section 108A, 108B, 108C, and 108D. Looking at a single quarter section 108B of tarp 100, as shown in FIG. 9, a total of six tarp panels 114 are connected to the yoke 104 along the transition seam at the edge 120AB of the yoke 104. In at least one aspect, the angled edge 136 of each tarp panel 114 connected to the yoke 104 has an angle 142 less than 90 degrees relative to the longitudinal edge 138 of each tarp panel 114. For example, the angle 142 of the angled edge 136 of each tarp panel 114 joined to the yoke 104 can be 45 degrees relative to the longitudinal edge 138 of each tarp panel 114. The longitudinal edge 138 of each tarp panel 114 can be parallel with seam 112B and the lateral edge 140 can be perpendicular with seam 112A. The same relationships for the lateral 140 and longitudinal edges 138 with seams 112A, 112B, 112C, and 112D applies to the other sections 108A, 108C, and 108D. In at least one aspect, the terminal end of each of the six tarp panels 114 are connected to the edge 120AB of the yoke 104 at transition seam 110. In one aspect, the length of transition seam 110 corresponding to the respective edges 120AB, 120BC, 120CD, and 120DA of the yoke 104 are equal. In another aspect, the length of transition seam 110 corresponding to the respective edges 120AB, 120BC, 120CD, and 120DA of the yoke 104 are unequal. For example, the length of the edge 120AB of the yoke 104 at the transition seam 110 is secured to the terminal ends of each of the six panels 114. In this configuration, the load and resulting stresses present during use of the fill under tarp 100 at the edge 120BC of the transition scam 110 is generally carried by each of the lengths of the edge of the six panels 114. The number of tarp panels 114 connected to the edges (e.g., 120AB, 120BC, 120CD, and 120DA) of the yoke 104 at transition seam 110 can be increased by changing the orientation of the yoke 104 relative to the body 128 of the tarp 100. Similarly, the number of tarp panels 114 connected to the edges (e.g., 120AB, 120BC, 120CD, and 120DA) of the yoke 104 at transition scam 110 can be increased by decreasing the width of each tarp panel or increasing the size of the yoke 104. Conversely, the number of tarp panels 114 connected to the edges (e.g., 120AB, 120BC, 120CD, and 120DA) of the yoke 104 at transition seam 110 can be decreased by increasing the width of each tarp panel 114 or decreasing the size of the yoke 104. In one preferred aspect, the yoke 104 is configured and/or oriented, such as in FIG. 9 and FIG. 10, to maximize the number of tarp panels 114 connected to the yoke 104 to increase the strength of transition seam 110. In another preferred aspect, the yoke 104 is configured and/or oriented, such as in FIG. 9 and FIG. 10, to maximize the number of tarp panels 114 connected to a single edge (e.g., 120AB, 120BC, 120CD, and 120DA) of the yoke 104 in a single section (e.g., 108A, 108B, 108C, and 108D) of the body 128 of the tarp 100 to increase the strength of transition seam 110. In at least one aspect, the terminal ends of a total of six tarp panels 114 are connected to the yoke 104 at the transition seam 110 where both the yoke 104 and the body 128 have an angle between scams that is less than 90 degrees. In at least one specific aspect, the terminal ends of a total of six tarp panels 114 are connected to the yoke 104 at the transition seam 110 where both the yoke 104 and the body 128 have an angle between seams that is equal to 85 degrees.

FIG. 5, FIG. 6, and FIG. 10 provide illustrations presenting additional aspects of the fill under tarp 100. As discussed herein, the body 128 of the tarp 100 can be configured from one or more sections (e.g., 108A, 108B, 108C, and 108D). One or more sections of the body 128 of the tarp 100 can have an angle between seams of the yoke that are equal to, less than, or greater than 90 degrees. One or more sections of the body 128 of the tarp 100 can have an angle between seams of the body 128 that are equal to, less than, or greater than 90 degrees. One or more sections of the body 128 of the tarp 100 can have an angle between seams 134A, 134B, 134C, and 134D extending between the inner edge 109 and respective corners 120A, 120B, 120C, and 120D of the yoke that are equal to 90 degrees, whereas the angle between the seams of the body 128 are not equal to 90 degrees and vice-versa. One or more sections of the body 128 of the tarp 100 can have an angle between scams 134A, 134B, 134C, and 134D extending between the inner edge 109 and respective corners 120A, 120B, 120C, and 120D of the yoke that are less than 90 degrees, whereas the angle between the seams of the body 128 are not less than 90 degrees and vice-versa. One or more sections of the body 128 of the tarp 100 can have an angle between seams 134A, 134B, 134C, and 134D extending between the inner edge 109 and respective corners 120A, 120B, 120C, and 120D of the yoke that are greater than 90 degrees, whereas the angle between the seams of the body 128 are not greater than 90 degrees and vice-versa. For example, FIG. 5 pictorially illustrates a section of the body 128 of the tarp 100 being equal to 90 degrees and the yoke 104 also being equal to 90 degrees. In another example, FIG. 6 pictorially illustrates a section of the body 128 of the tarp 100 being less than 90 degrees, whereas the yoke 104 is equal to 90 degrees. In yet another example, FIG. 10 pictorially illustrates a section of the body 128 of the tarp 100 being less than 90 degrees and the yoke 104 also being less than 90 degrees. In at least one specific aspect, one, or more, or all the sections of the body 128 of the tarp 100 are 85 degrees and the seams 134A, 134B, 134C, and 134D extending between the inner edge 109 and respective corners 120A, 120B, 120C, and 120D of yoke 104 are also 85 degrees. The seams 134A, 134B, 134C, and 134D extending between the inner edge 109 and respective corners 120A, 120B, 120C, and 120D yoke 104 having an angle less than 90 degrees provides an inner edge 109 of the opening 130 that best approximates the circumference of the lift ring 106. In at least one specific example, the seams 134A, 134B, 134C, and 134D extending between the inner edge 109 and respective corners 120A, 120B, 120C, and 120D yoke 104 of each section has an angle of 85 degrees thereby providing an inner edge 109 of the opening 130 that best approximates the circumference of the lift ring 106. The body 128 having an angle less than 90 degrees between seams of one, or more, or all sections provides a fill under tarp 100 having a body 128 that better approximates the conical shape of the grain. In at least one specific example, the body 128 has an angle of 85 degrees between seams thereby providing a fill under tarp 100 having a body 128 that best approximates the conical shape of the grain.

Figure 11A:
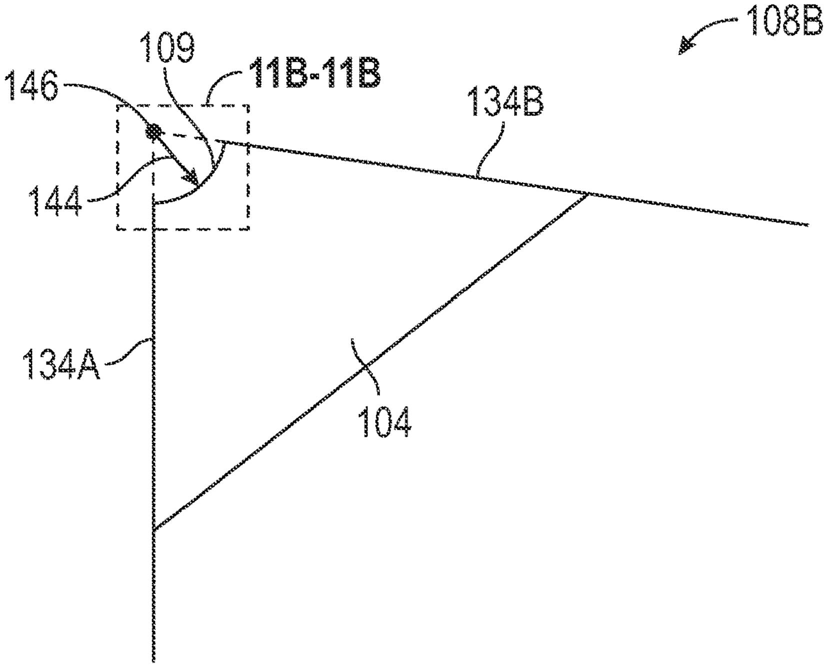
FIGS. 11A-11D are pictorial representations showing calculation of a radius and inner edge of the yoke and tarp section overlap.
Figure 11B:
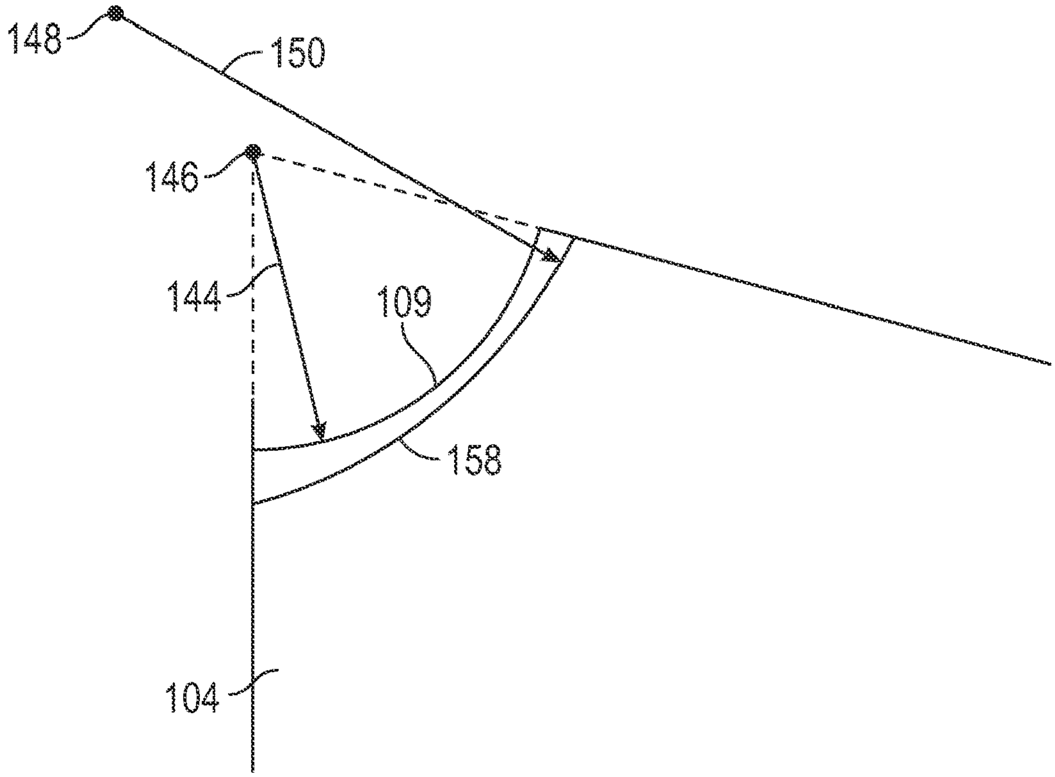
Figure 11C:
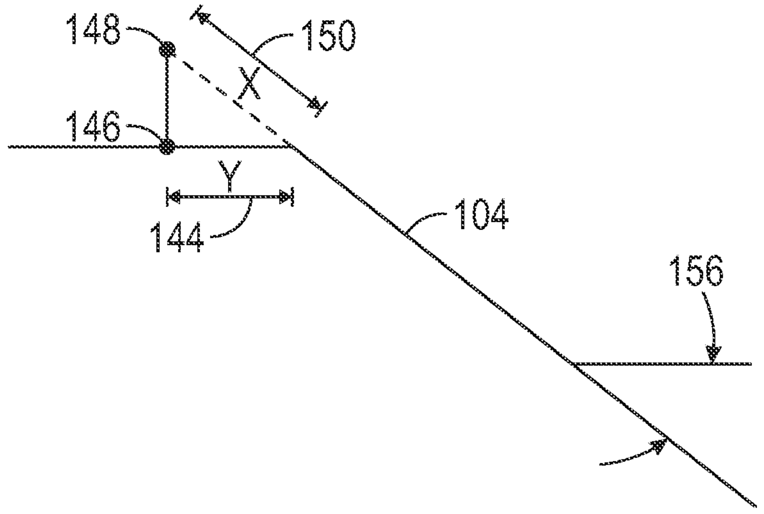
Figure 11D:
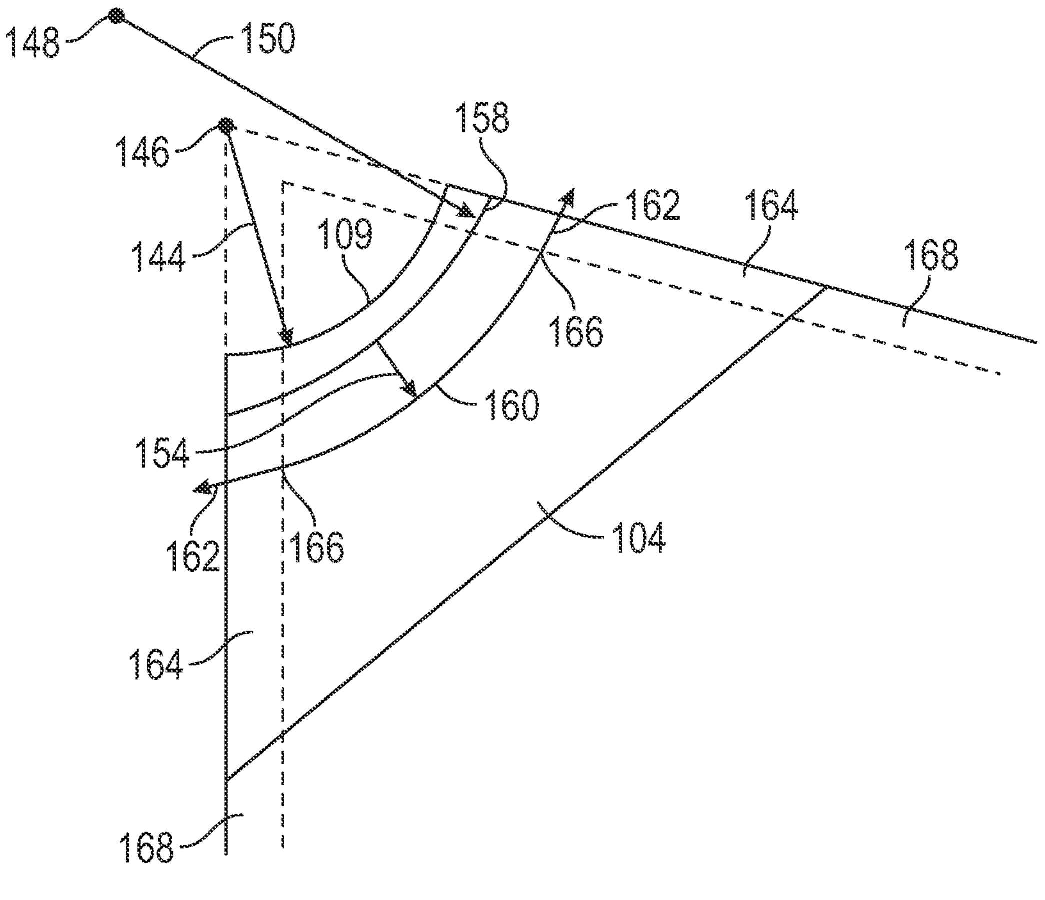
Figure 12:
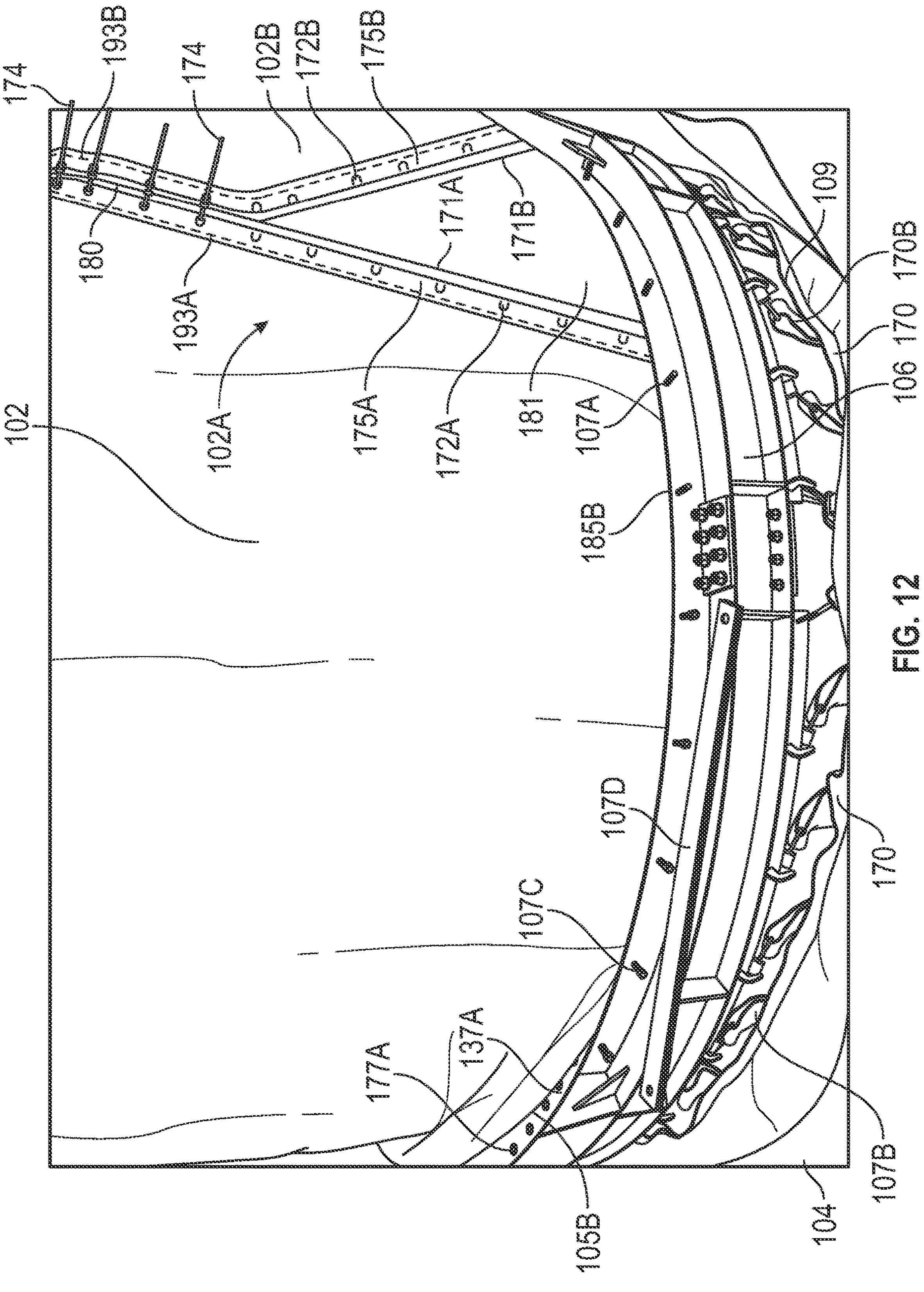
FIG. 12 is a pictorial representation of a lower portion of the center tower skirt and lift ring.

FIGS. 11A-11D are pictorial representations showing calculation of a radius and inner edge and/or arc of the yoke and tarp section overlap. Referring to the figures, FIG. 11A is a pictorial representation taken from FIG. 10 showing the yoke 104 and a partial portion of the corresponding tarp section 108B. Each tarp section in the figures includes an inner edge 109 of the yoke 104 and corresponding tarp section (e.g., 108A, 108B, 108C, and 108D) where the body 128 and yoke 104 of the tarp 100 have sections (e.g., 108A, 108B, 108C, and 108D) with an angle less than 90 degrees, such as 85 degrees. The lift ring 106 (FIG. 3) is generally circular in shape and has a circumference with a preferred radius or arc, depending upon the type of tarp configuration. At least part of the fabrication of the fill-under tarp 100 is performed while the tarp is lying flat on a surface. For example, the inner edge 109 of the yoke 104 is often cut, for convenience, while the tarp 100 is lying flat on a surface. The original radius 144 of the cut arc can be measured from the center point 146 where two opposing scams (e.g., 134A, 134B, 134C, and 134D) of a section (e.g., 108A, 108B, 108C, and 108D) would intersect if extended from the inner edge 109 toward the center the yoke 104. However, cutting the inner edge 109 of the yoke 104 using this approach results in an inner edge 109 that fails to accurately approximate the radius and arc of the lift ring 106 when the tarp 100 is in-use and conical in shape. Thus, in a preferred aspect of the present disclosure, the inner edge 109 is adjusted for being cut while the tarp 100 is lying flat and cut in a manner to best approximate the shape of the lift ring 106 so the hooks 107B (FIG. 2) attach to the lift ring 106 for when the tarp 100 is in-use and conical in shape, such as, when the tarp 100 is extending outward from the lift ring 106 at the angle of repose 156 of the grain (e.g., approximately 21 degrees). Since the arc length of the inner edge 109 should not change to match the circumference of the lift ring 106, to best approximate the arc length of the inner edge 109 for a section (e.g., 108A, 108B, 108C, and 108D) of the tarp 100 when in use, the center point 146 is moved away from the inner edge 109 and the center point 146 to create an adjusted center point 148. The original radius 144 is also lengthened congruent with the distance the center point 146 is adjusted to location of the adjusted center point 148 for creating an adjusted radius 150. The following formula can be used to calculate the adjusted radius:

$$x = y/\cos * (\text{angle of repose})$$

where the variable "x" is the distance of the adjusted radius 150, "y" is the original radius 144, "cos" is the abbreviation for cosine, and "angle of repose" 156 is the angle of the pile of grain and tarp when in-use.

Using the adjusted radius 150 a cut is made along the arc of the adjusted radius 150 in the yoke 104 creating an arc defining the adjusted inner edge 158 that best approximates the lift ring 106 when the tarp 100 is in-use, conical in shape, and angled generally at the angle of repose 156.

Installing the tarp 100 often involves joining yoke seams (e.g., 134A, 134B, 134C, and 134D) and section scams (e.g., 112A, 112B, 112C, and 112D) of each section (e.g., 108A, 108B, 108C, and 108D) together in the field, also known as "field seaming." It is often desirable to overlap seams (e.g., 134A, 134B, 134C, 134D, 112A, 112B, 112C, and 112D) of each section (e.g., 108A, 108B, 108C, and 108D) when field seaming sections together. It is further desirable to allow for overlap of the adjoining seams of the body 128 of the tarp 100 to have a sufficient amount of material joined together to create integrity in the seams. To create yoke overlap 164 in the yoke 104 of the tarp 100 for field-seaming, the arc defining the adjusted inner edge 158 is moved inward in the direction of arrow 154 toward the body 128 of the tarp 100 until there is sufficient material for overlapping for creating an adjusted arc 160. In at least one aspect of the disclosure, the arc defining the adjusted inner edge 158 is moved sufficiently inward in the direction of arrow 154 toward the body 128 of the tarp 100 to the adjusted arc 160 location to create an eight-inch width of overlapping material along the yoke seams (e.g., 134A, 134B, 134C, and 134D) and section seams (e.g., 112A, 112B, 112C, and 112D) of each section (e.g., 108A, 108B, 108C, and 108D). In another aspect, the arc defining the adjusted inner edge 158 is moved sufficiently inward in the direction of arrow 154 toward the body 128 of the tarp 100 to the adjusted arc 160 location to create less or more than an eight-inch width of overlapping material along the yoke seams (e.g., 134A, 134B, 134C, and 134D) and section seams (e.g., 112A, 112B, 112C, and 112D) of each section (e.g., 108A, 108B, 108C, and 108D). Since the adjusted arc 160 does not reach the yoke seams (e.g., 134A, 134B, 134C, and 134D), the opposing ends 166 of the adjusted arc 160 are extended on a path 162 tangent to the opposing ends 166 of the adjusted arc 160 so that the adjusted arc 160 extends to the seams (e.g., 134A, 134B, 134C, and 134D) of each section (e.g., 108A, 108B, 108C, and 108D) to create overlap in the yoke 104 for field-seaming. Tarp body overlap 168 can also be created for field seaming the adjoining seams of the body 128 of the tarp 100 together.

Figure 13A:
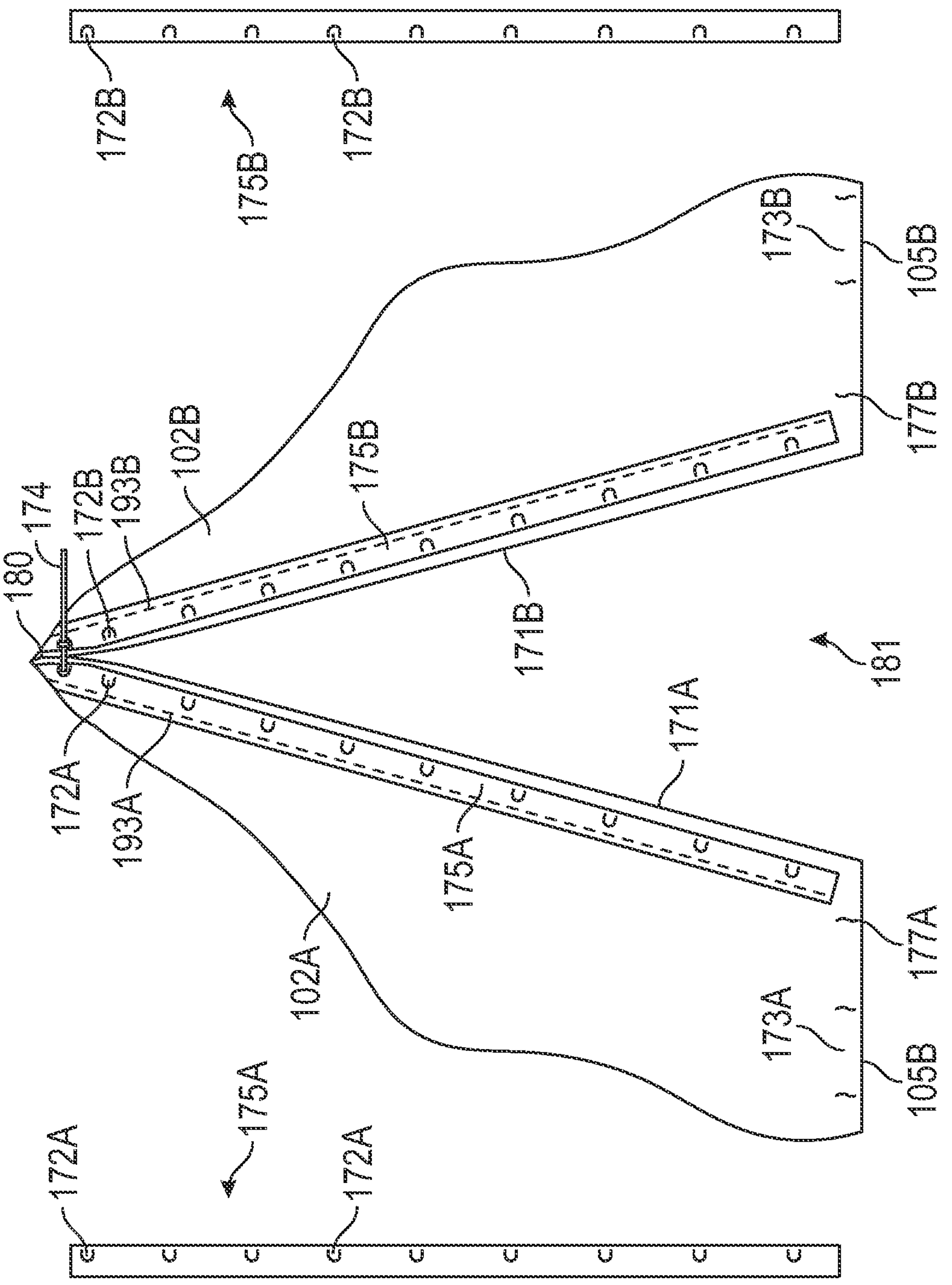
FIG. 13A is a pictorial representation of lower portions of adjoining sections of a center tower skirt.
Figure 13B:
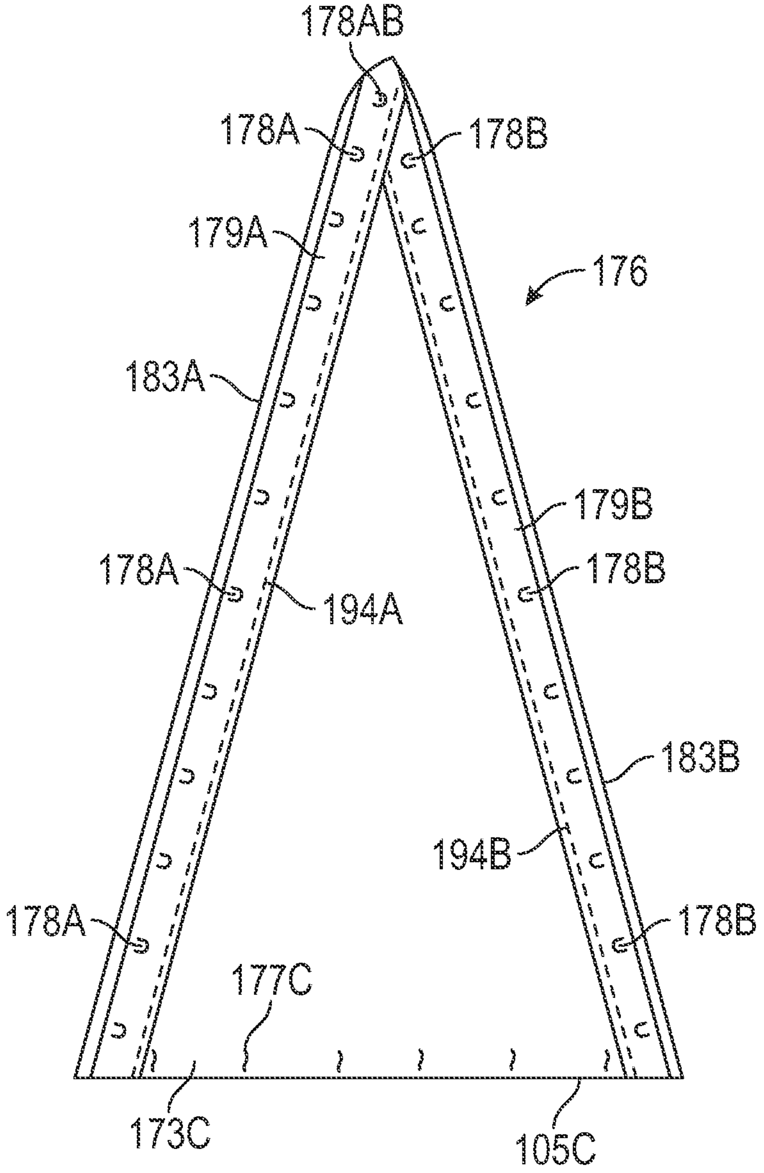
FIG. 13B is a pictorial representation of an insert for joining lower portions of sections of a center tower skirt.
Figure 13C:
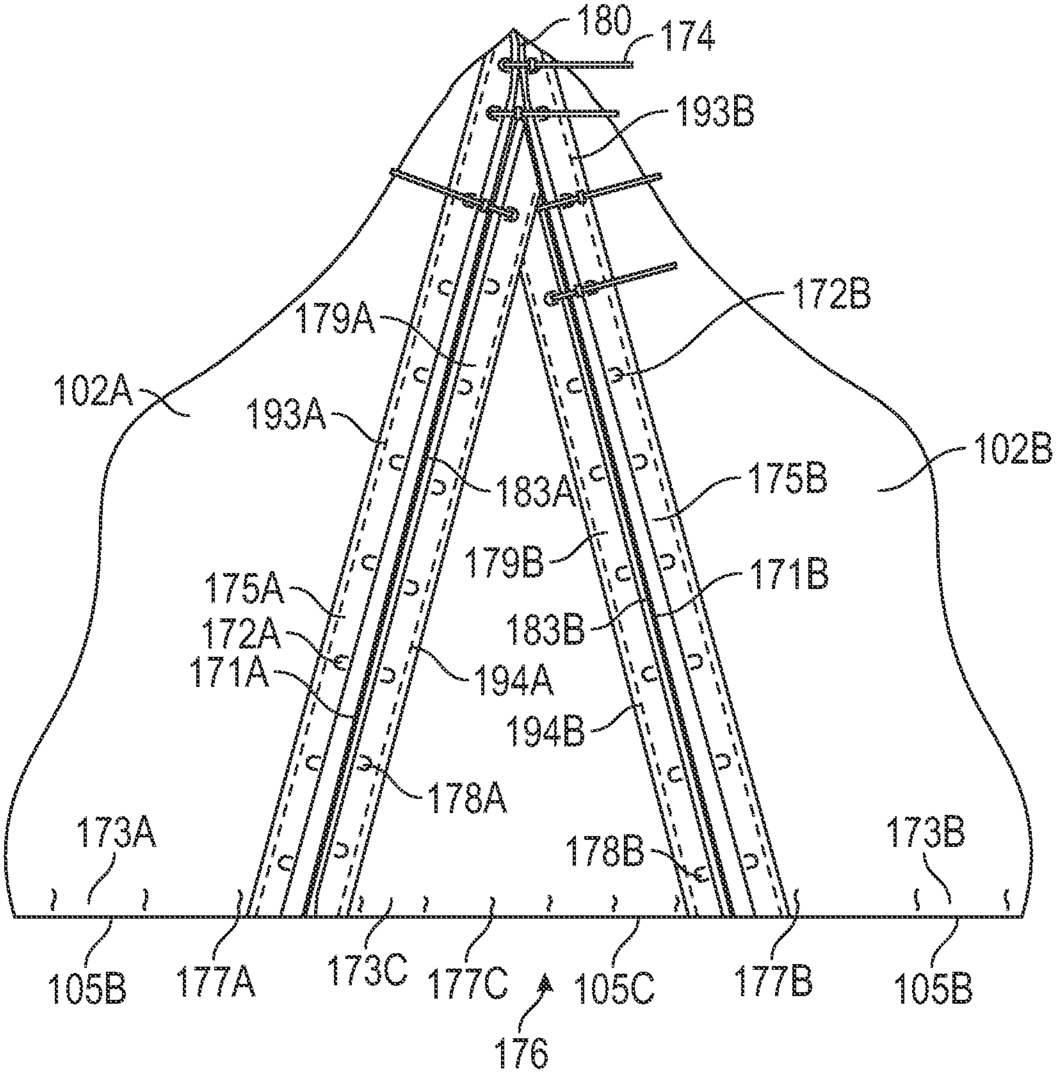
FIG. 13C is a pictorial representation of insert joined lower portions of sections of a center tower skirt.
Figure 14A:
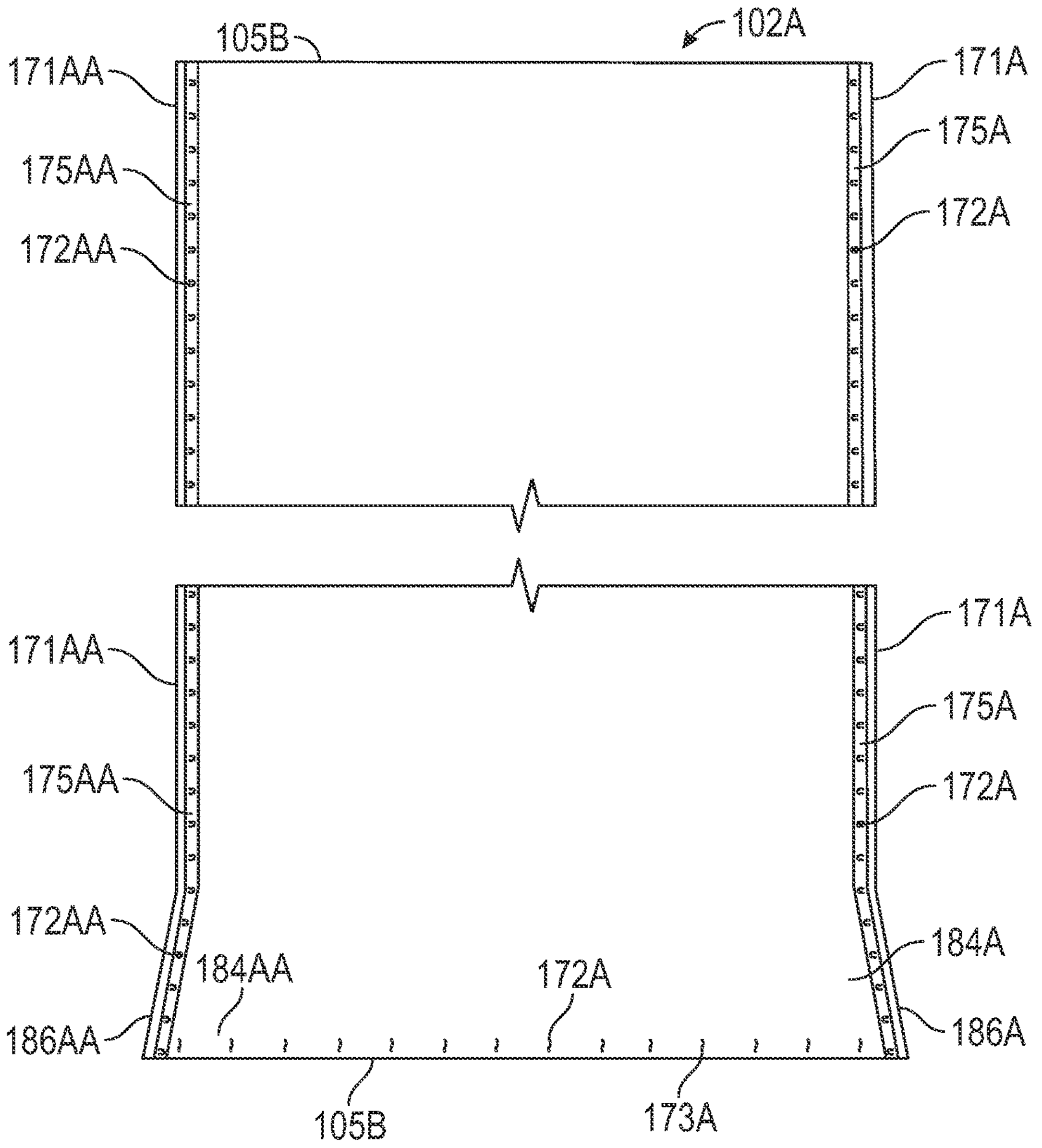
FIG. 14A is a pictorial representation showing a cross sectional view of a section of a center tower skirt in accordance with an exemplary aspect of the present disclosure.
Figure 14B:
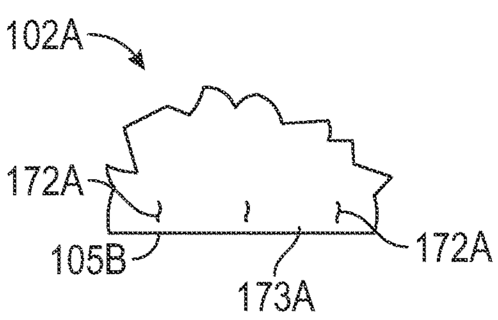
FIG. 14B is a pictorial representation of a lower edge of the tower skirt taken along lines 14B-14B in FIG. 14A.
Figure 14C:
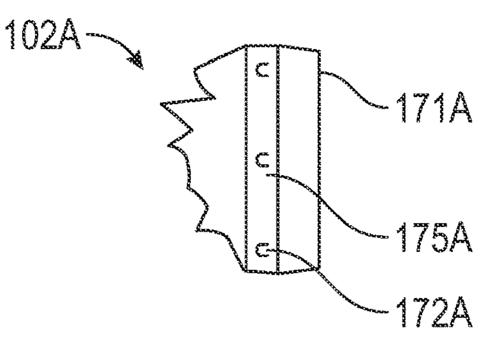
FIG. 14C is a pictorial representation of a lower edge of the tower skirt taken along lines 14C-14C in FIG. 14A.
Figure 14D:
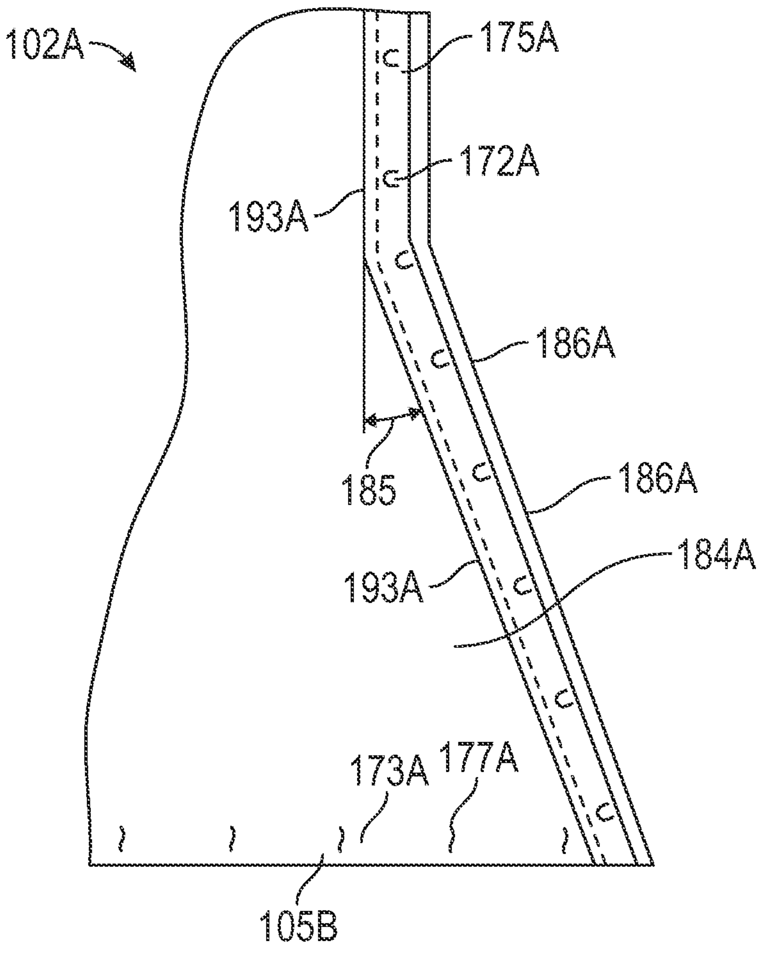
FIG. 14D is a pictorial representation of a flared portion at a lower edge of the tower skirt taken along lines 14D-14D in FIG. 14A.
Figure 14E:
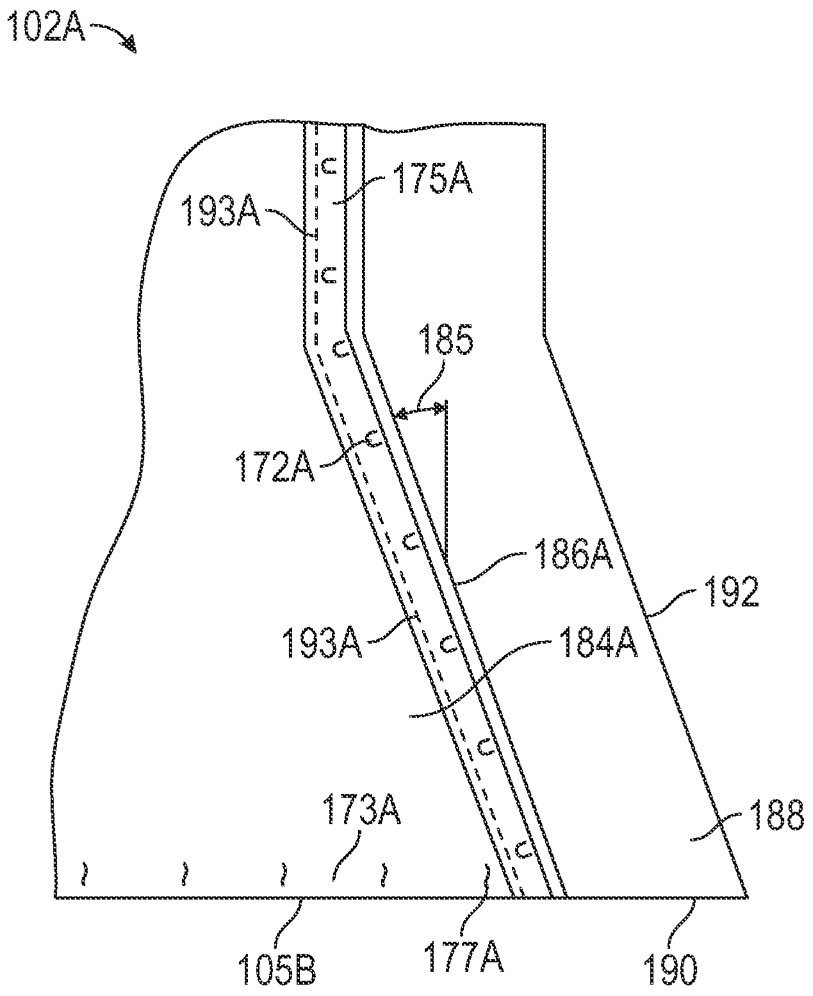
FIG. 14E is a pictorial representation of an optional flaring flap at the flared portion at a lower edge of the tower skirt shown in FIG. 14D.

FIG. 12 and FIGS. 13A-13C illustrate a lower portion of center tower skirt 102. In one aspect, center tower skirt 102 is assembled from tower skirt sections, such as tower skirt section 102A and tower skirt section 102B. Several center tower skirt sections may be assembled to form center tower skirt 102, such as by assembling two or more center tower skirt sections. Each tower skirt section is joined at center tower skirt section seams, such as center tower skirt section seam 180, along center tower skirt section edges, such as section edge 171A and section edge 171B illustrated, for example, as shown in FIG. 13A. Section webbing forms edges of center tower skirt sections, such as, for example, as best illustrated in FIG. 13A, section webbing 175A forming a portion of edge 171A of center tower skirt section 102A and section webbing 175B forming a portion of edge 171B of center tower skirt section 102B. Section webbing 175A, 175B can be configured from strips of vinyl and attached adjacent section edges 171A, 171B of each respective tower skirt section 102A, 102B by respective seams 193A, 193B. Seams 193A, 193B can be a heat weld for securing webbing 175A, 175B adjacent respective edges 171A, 171B. In other aspects, seams 193A, 193B can be configured from stitching webbing 175A, 175B adjacent respective edges 171A, 171B. Webbing, such as webbing 175A, 175B, can be attached to material along edges of tower skirt sections for joining adjoining edge sections. Webbing, such as webbing 175A, 175B, can be attached to material along edges of other sections of the body of tarp 100. Openings 172A are disposed and generally spaced equidistant apart along the length of section webbing 175A. Openings 172B are disposed and generally spaced equidistant apart along the length of section webbing 175B. In one aspect, openings 172A, 172B pass only through webbing 175A, 175B and not the tarp material forming section edges 171A, 171B of respective tower skirt sections 102A, 102B thereby maintaining the material integrity of sections edges 171A, 171B. Use of webbing, such as webbing 175A, 175B, decreases the cost to manufacture tower skirt sections and exceeds the strength of securements 174. Use of webbing, such as webbing 175A, 175B, also seamlines and makes manufacturing easier over hemming edges and creating openings directly in the tarp material forming each tower skirt section. In one aspect, openings 172A, 172B are "U" shaped openings rotated 90-degrees with the bottom of the "U" facing outward from section edges 171A, 171B, as illustrated, for example, in FIG. 13A. The spacing of openings 172A in webbing 175A attached to center tower skirt section 102A generally align with the spacing of openings 172B in webbing 175B attached to center tower skirt section 102B. Openings 177A are disposed and generally spaced equidistant apart along lower edge webbing 173A at lower edge 105B of center tower skirt section 102A. Similarly, openings 177B are disposed and generally spaced equidistant along lower edge webbing 173B at lower edge 105B of center tower skirt section 102B. Openings, such as openings 177A, 177B, can be slits made and extending through the tarp material to create an opening in the tarp material. Lift ring 106 includes orthogonally and outwardly extending posts 107A, such as orthogonally and outwardly extending bolts, spaced generally equidistant apart along its circumference. Posts 107A are received through (mated with) openings 173A, 173B for connecting lower edge 105B of center tower skirt 102 with lift ring 106. A retainer reinforcement member 107D, such as a metal strap, can be used to aid in securing lower edge 105B of center tower skirt 102 to posts 107A on lift ring 106. Retainer members 107C secure lower edge 105B of center tower skirt 102 and retainer reinforcement member 107D to posts 107A on lift ring 106, such as by threading a retaining member 107C nut onto a threaded post 107A. In this manner, lower edge 105B of center tower skirt 102 is sandwiched between lift ring 106 and retainer reinforcement member 107D and retained in the sandwiched position with the aid of posts 107A extending through openings 173A, 173B in lower edge 105B of center tower skirt 102. Not all lift rings are the same size or have the same circumference. The spacing of openings 173A, 173B in the lower edge 105B of center tower skirt 102 are generally spaced closer together than the spacing of posts 107A on lift ring 106 allowing openings 173A, 173B in center tower skirt 102 to be fitted to different size lift rings 106. In the case where lift ring 106 has a larger circumference than center tower skirt 102, a center tower skirt section scam gap 181 can exist where section webbing 175A of center tower skirt section 102A does not overlap with section webbing 175B of center tower skirt section 102B. Scam gap 181 also occurs given that center tower skirt 102 has a circular circumference that is configured to fit the rectangular perimeter of center tower structure 118 shown in FIG. 4. Additionally, opening 130 in yoke 104 is circular and the center tower structure 118 has a rectangular perimeter. A center tower skirt gap bridging insert 176 can be inserted into center tower skirt section seam gap 181 and secured by webbing 179A on one side of insert 176 to section webbing 175A of center tower skirt section 102A and webbing 179B on the other side of insert 176 to section web 175B of center tower skirt section 102B. Webbing 179A, 179B can be secured to and along adjacent edges of center tower skirt bridging insert 176 along scams 194A, 194B. An exemplary center tower skirt gap bridging insert 176 is illustrated, for example, in FIG. 13B, to accommodate the difference in the circular circumference of center tower skirt 102 and rectangular perimeter of center tower structure 118. Center tower skirt gap bridging insert 176 has lower edge bridge webbing 173C at lower edge 105C that is spaced between opposing converging bridging gap insert edges 183A, 183B. Openings 178A are disposed and generally spaced equidistant apart along the length of bridge webbing 179A in a spacing pattern generally matching the spacing pattern of openings 172A in section webbing 175A of center tower skirt section 102A. Openings 178B are disposed and generally spaced equidistant apart along the length of bridge webbing 179B in a spacing pattern generally matching the spacing pattern of openings 172B in section webbing 175B of center tower skirt section 102B. Opening 178AB is disposed at the apex of center tower skirt gap bridging insert 176 generally located at the intersection of bridge webbings 179A, 179B. Openings 177C are disposed and generally spaced equidistant apart along length of lower edge bridge webbing 173C and in a spacing pattern generally matching the spacing pattern of openings 177A in lower edge webbing 173A of center tower skirt section 102A and openings 177B in lower edge webbing 173B of center tower skirt section 102B. Center tower skirt gap bridging insert 176 can be adjusted in size to accommodate larger center tower skirt section seam gap 181. Center tower skirt section seam gap 181 can also be adjusted in size by increasing or decreasing the length of center tower skirt section seam 180 by increasing or decreasing the number of section openings 172A, 172B joined together with securements 174, such as, for example, cable zip ties. Although cable zip tie securements 174 are shown, the present disclosure contemplates securements 174 including, but not limited to, stitching, heat welds (i.e., welding together tarp material with heat), adhesives, straps, twine, yarn, rope, or other securement members appropriate for joining various grain tarp types of material. Center tower skirt gap bridging insert 176 is installed by abutting webbings 175A, 179A and 175B, 179B, aligning openings 172A, 178A and 172B, 178B, and joining openings 172A, 178A and 172B, 178B with securements 174 as best illustrated, for example, in FIG. 13C. Posts 107A on lift ring 106 are received through (mated with) openings 177C for connecting lower edge 105C of center tower skirt gap bridging insert 176 to lift ring 106. Retainer members 107C secure lower edge 105C of center tower skirt gap bridging insert 176 and retainer reinforcement member 107D to posts 107A on lift ring 106, such as by threading a retaining member 107C nut onto a threaded post 107A. In this manner, lower edge 105C of center tower skirt gap bridging insert 176 is sandwiched between lift ring 106 and retainer reinforcement member 107D and retained in the sandwiched position with the aid of posts 107A extending through openings 177A in lower edge 105C of center tower skirt gap bridging insert 176. Center tower skirt gap bridging insert 176 closes center tower skirt section seam gap 181 to keep grain traveling within and from spilling out from center tower skirt 102. Center tower skirt gap bridging insert 176 can be configured to accommodate various size of center tower skirt section seam gaps 181 depending on the difference in the size of the circumference of lift ring 106 and center tower skirt 102. Although the present disclosure, for the purpose of illustration, discloses center tower skirt gap bridging insert 176 for closing center tower skirt section seam gap 181 in center tower skirt sections 102A, 102B, any number of inserts 176 with webbing, such as webbings 179A, 179B may be employed depending upon the number of tower skirt sections and the difference in the size between center tower skirt 102 and lift ring 106. In one aspect of the present disclosure, lower edges 105B, 105C of center tower skirt 102 have a larger circumference, such as a circular circumference, than the rectangular perimeter of upper edge 105A of center tower skirt 102. For example, increasing the length of lower edge 105C of center tower skirt gap bridging insert 176 increases the circumference of lower edges 105B, 105C of center tower skirt 102. Although the preceding references center tower skirt sections 102A, 102B, any number of sections can be connected to form center tower skirt 102. In one aspect four sections are joined together to form center tower skirt 102.

Figure 15A:
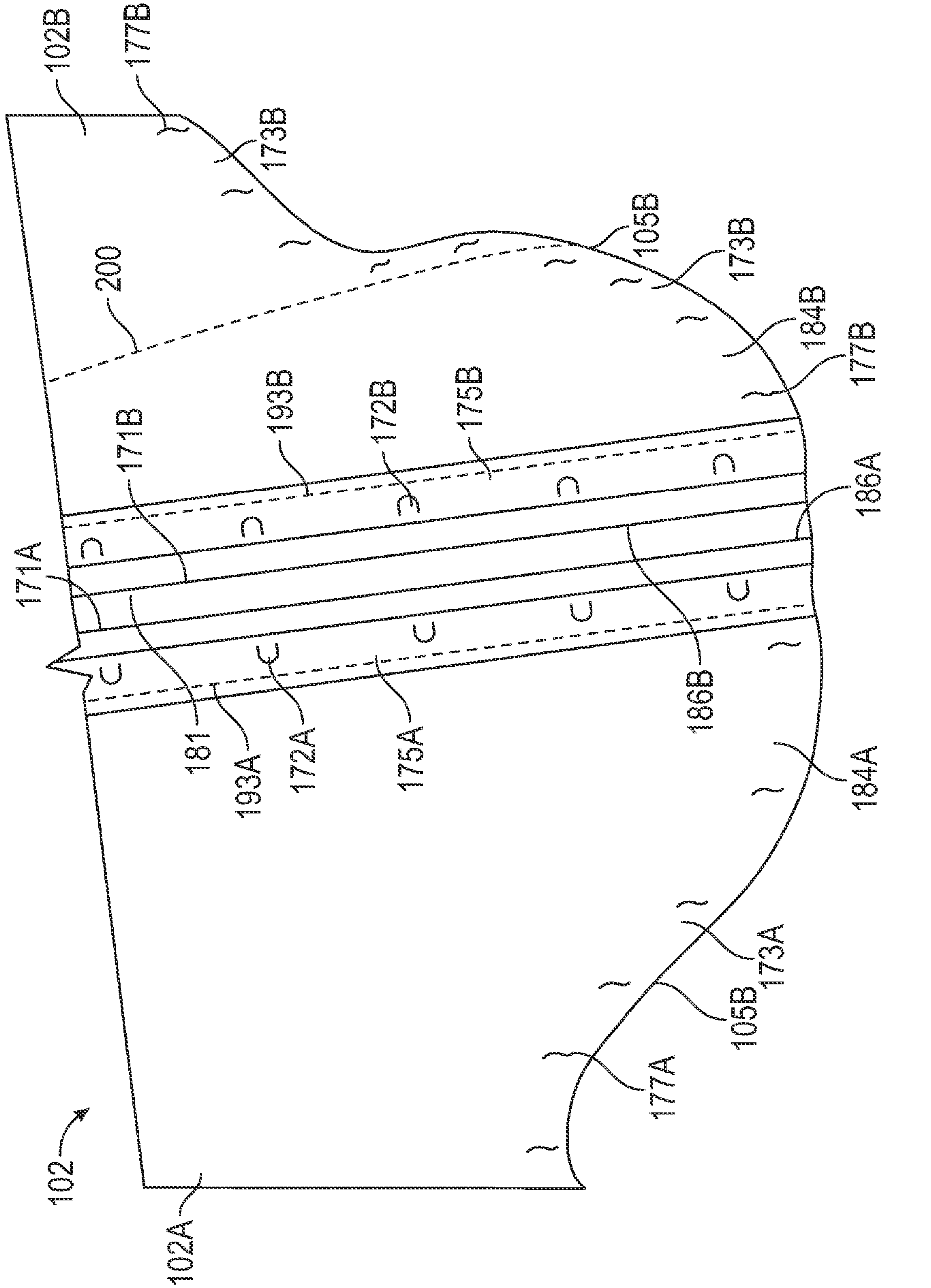
FIG. 15A is a pictorial representation showing flared portions of adjoining center tower skirt sections in accordance with an exemplary aspect of the present disclosure.
Figure 15B:
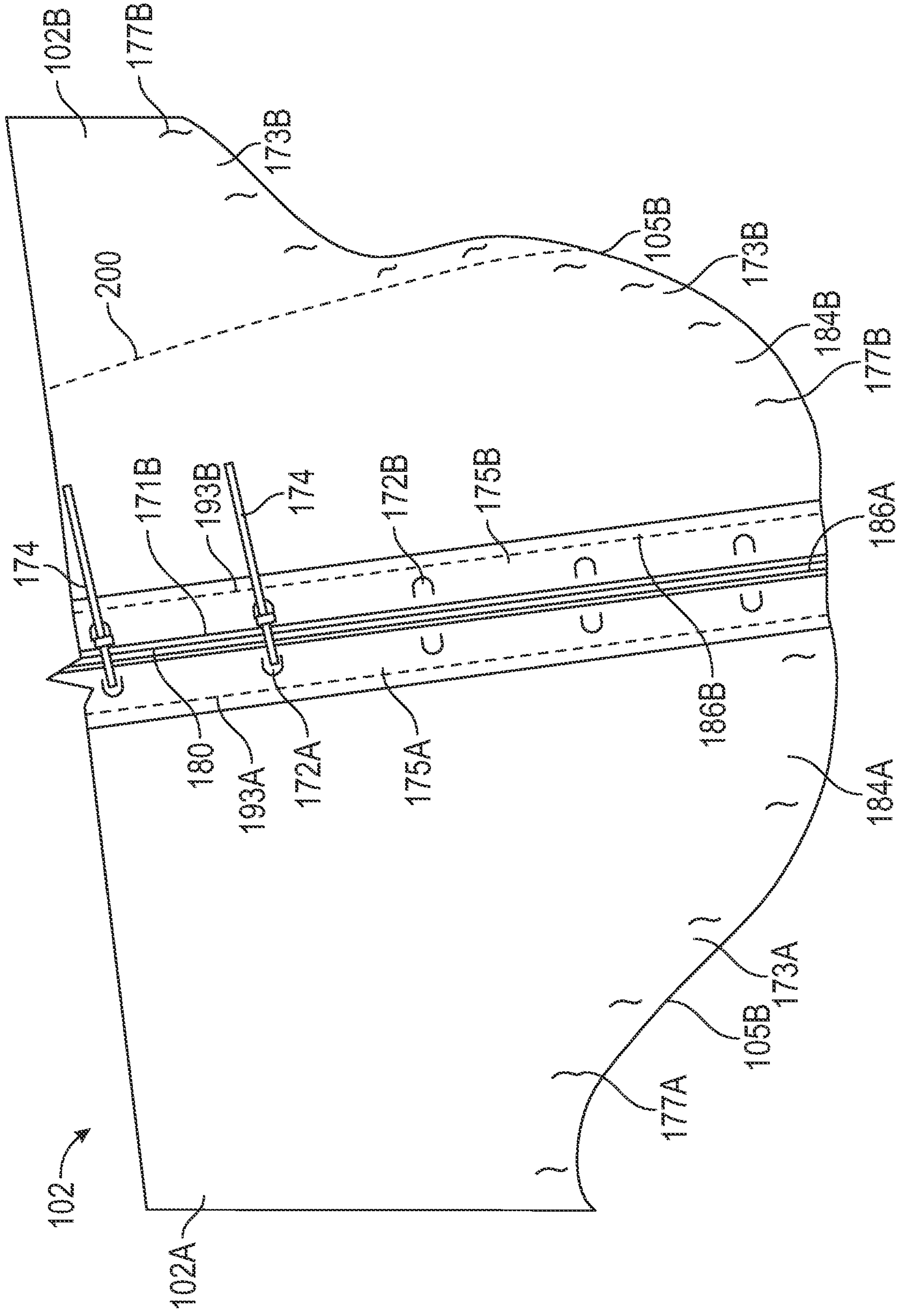
FIG. 15B is a pictorial representation showing attachment of adjoining center tower skirt sections in accordance with an exemplary aspect of the present disclosure.

FIGS. 14A-E and FIGS. 15A-B illustrate an exemplary aspect of the present disclosure for center tower skirt 102 to accommodate the difference in the circular circumference of center tower skirt 102 and rectangular perimeter of center tower structure 118 and thereby prevent leakage of grain from center tower skirt 102 through center tower skirt section seams or seam gaps, such as seam 180 and seam gap 181. A single section of a center tower skirt, such as center tower skirt section 102A of center tower skirt 102, is shown for purposes of illustration, in FIGS. 14A-E. Any number of skirt sections can be used for form center tower skirt 102. Center tower skirt section 102A is shown in FIGS. 14A-E. Center tower skirt section 102A includes opposing section edges 171A, 171AA spaced between upper edge 105A (shown in FIG. 1) and lower edge 105B. Section edge 171A includes section webbing 175A and section edge 171AA includes section webbing 175AA, such as webbing shown in FIG. 13A. Openings 172A, such as “U” shaped openings rotated 90-degrees, are disposed in and generally spaced equidistant apart along section webbing 175A and openings 172AA, such as “U” shaped openings rotated 90-degrees, are disposed in and generally spaced equidistant apart along section webbing 175AA. Openings 172A, 172AA in webbings 175A, 175AA on opposing sections edges 171A, 171AA align with a same set of openings in an adjoining center tower skirt section and can be connected using one or more types of securements 174 to assemble center tower skirt from two or more center tower skirt sections. Openings 177A are disposed in and generally spaced equidistant apart along lower edge webbing 173A at lower edge 105B of center tower skirt section 102A. Lower edge 105B of center tower tarp section 102A is secured to lift ring 106 using openings 177A. Lower portions of section edges 171A, 171AA include center tower flared edges 186A, 186AA for providing center tower skirt flares 184A, 184AA on each lower section side 171A, 171AA of center tower skirt section 102A. In one aspect, center tower skirt section 102A can be configured with section edge 171A having center tower skirt flare 184A with center tower skirt flared edge 186A and section edge 171AA having no center tower skirt flare 184AA with center tower skirt flared edge 186AA. In another aspect of the present disclosure, center tower skirt section 102A can be configured without section edge 171A having center tower skirt flare 184A with center tower skirt flared edge 186A and section edge 171AA configured having center tower skirt flare 184AA with center tower skirt flared edge 186AA. Openings 177A are disposed in and generally spaced equidistant apart along lower edge webbing 173A at lower edge 105B of center tower skirt flares 184A, 184AA. Lower edge 105B of center tower tarp flares 184A, 184AA is secured to lift ring 106 using openings 177A. Lower portions of section sides 171A, 171AA have a separation distance greater than middle or upper portions of section sides 171A, 171AA to provide center tower skirt flares 184A, 184AA. In one aspect, center tower skirt flared edges 186A, 186AA can have an angle 185 relative to respective section edges 171A, 171AA between 10-45 degrees or greater as best illustrated, by way of example, in FIG. 14D. A greater angle 185 or by moving the starting point of center tower skirt flared edge farther away from lower edge 105B increases the size of the center tower skirt flares 184A, 184AA thereby increasing the overall circumference of lower edge 105B of center tower skirt 102 when assembled from two or more center tower skirt sections having center tower skirt flares, thereby providing an assembled center tower skirt 102 that can accommodate the difference in the circular circumference of center tower skirt 102 and rectangular perimeter of center tower structure 118 and thereby prevent grain from escaping out of center tower skirt 102 through center tower section seams, such as center tower section seam 180 illustrated, by way of example, in FIG. 15A. In one aspect, center tower skirt flares 184A, 184AA can one or both run along a substantial portion of section edges. As best shown in FIG. 15A, section edge 171A of center tower skirt section 102A and section edge 171B of center tower skirt 102B are positioned together with openings 172A, 172B in webbing 175A, 175B aligned for assembly of the body of center tower skirt 102 and attachment of lower edge 105B to lift ring 106. As best shown in FIG. 15B, section webbing 175A of center tower skirt section 102A and section webbing 175B of center tower skirt section 102B are abutted and securements 174 are used to join section edges 171A, 171B using openings 172A, 172B in webbing 175A, 175B to close section gap 181. Section edges 171A, 171B, section webbing 175A, 175B, and/or openings 172A, 172B can be joined together using various types of securements 174, including, but not limited to, stitching, heat welds (i.e., welding together tarp material with heat), adhesives, clips, snaps, pins, bolts, nuts, straps, twine, yarn, and/or rope. Openings 177A, 177B in lower edge webbing 173A, 173B of respective center tower skirt flares 184A, 184B are secured to lift ring 106 to, in at least one aspect, prevent grain from escaping center tower skirt 102. Similarly, closing gap 181 with tower skirt section seam 180 along joined section edges 171A, 171B aids in preventing grain from escaping center tower skirt 102. Center tower skirt flared portions also allow lower edge 105B of center tower skirt 102 to be fit to various shaped and sized lift rings 106. In at least one aspect of the present disclosure, as best illustrated by way of example in FIGS. 14E and FIGS. 15A-B, a center tower skirt flaring flap 188. Center tower skirt flaring flap 188 can be attached to the underside of center tower skirt flared edge 186A or attached to the underside of section edge 171A in the case where there is no center tower skirt flare 184A. Center tower skirt flaring flap 188 can be attached, in at least one aspect of the disclosure, to the underside of center tower skirt flared edge 186A and adjoining portions of section edge 171A. Center tower skirt flaring flap 188 extends outwardly from center tower skirt flared edge 186A, has a terminal lower bottom edge 190 generally coincident with lower edge 105B of center tower skirt section 102A, and a terminal outer edge 192 that extends upwardly and inwardly in generally parallel relation to center tower skirt flared edge 186A, and extends upwardly in generally parallel relation to sections edge 171A. Center tower skirt flaring flap 188 is located on the underside of assembled center tower sections 102A, 102B along and directly behind center tower skirt section seam 180 to aid in preventing grain from escaping center tower skirt 102 through center tower skirt section seam 180. In one aspect, lower bottom edge 190 of center tower skirt flaring flap 188 can include openings, like openings 177A in lower edge webbing 173A of center tower skirt section 102A to securing center tower skirt flaring flap 188 to lift ring 106. Center tower skirt flaring flap 188 can be configured into both flaring 186A and non-flaring section edges 171A of one or more sections of a center tower skirt 102 to accommodate the difference in the circular circumference of center tower skirt 102 and rectangular perimeter of center tower structure 118 and thereby prevent grain from escaping out of center tower skirt 102 through center tower section seams, such as center tower section seam 180 illustrated, by way of example, in FIG. 15A.

The disclosure is not to be limited to the particular aspects described herein. In particular, the disclosure contemplates numerous variations in yoke 104 and body 128 of the fill under tarp 100. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

What is claimed is:

1. A fill under tarp for grain, comprising:

a tarp body having a plurality of tarp sections, each tarp section having an inner edge extending to a terminal outer edge defining an outer perimeter of the tarp body;

a tarp section seam disposed between each adjoining tarp section, wherein the tarp section seam extends between the inner and terminal outer edge of the tarp body;

a yoke having a center, an inner terminal edge defining a yoke opening and an outer terminal edge, the yoke disposed generally in the center of the tarp body and configured for strengthening the tarp body;

a center tower skirt having a plurality of skirt sections, each skirt section having opposing section edges seamed together and disposed between opposing upper and lower terminal edges, the lower terminal edges of the center tower skirt define a center tower skirt opening coincident with the yoke opening configured to receive grain for storing underneath the fill under tarp;

lower portions of the section edges have a separation distance greater than middle or upper portions of the side sections to provide a flared portion with converging, outwardly extending flared edges; and a transition seam disposed between the outer terminal edge of the yoke and the inner edge of the tarp body.

2. The fill under tarp of claim 1, further comprising:

a center tower skirt section seam along which adjoining section edges of the plurality of skirt sections are joined.

3. The fill under tarp of claim 1, further comprising:

a flared edge section seam along which adjoining flared edges of the flared portions of the plurality of skirt sections are joined.

4. The fill under tarp of claim 1, further comprising:

a circumference of the lower terminal edge of the center tower skirt being greater than a circumference of the upper terminal edge of the center tower skirt.

5. The fill under tarp of claim 1, further comprising:

a plurality of openings disposed proximate the flared edges of the flared portion, at least one set of the plurality of openings are disposed in a bottom one of the flared edges for securing to a lift ring to prevent grain leakage between the bottom one of the flared edges and the lift ring.

6. The fill under tarp of claim 5, further comprising:

a center tower skirt flaring flap extending outwardly from the flared portion of the center tower skirt, wherein at least a portion of the flap is disposed behind a center tower skirt section seam to seal the center tower skirt section seam against grain leakage during grain filling operations.

7. The fill under tarp of claim 1, further comprising:

a plurality of openings disposed proximate the flared edges of the flared portion, at least one set of the plurality of openings are disposed in a webbing attached along an outwardly extending one of the flared edges for securing to the section edge of an adjoining center tower skirt section to seal the flared edges against grain leakage.

8. The fill under tarp of claim 1, further comprising:

a center tower skirt flaring flap having opposing converging edges extending outwardly from the flared portion and section edge of the center tower skirt, wherein at least a portion of the flap is disposed behind a flared edge section seam to seal the flared edge section seam against grain leakage.

9. The fill under tarp of claim 1, wherein at least one section edge of each skirt section is orthogonal to the lower terminal edge.

10. The fill under tarp of claim 1, wherein at least one section edge of each skirt section is acute to the lower terminal edge.

* * * * *